United States Patent [19]

Ito et al.

[11] Patent Number: 4,738,523
[45] Date of Patent: Apr. 19, 1988

[54] RETRIEVAL CONTROL APPARATUS FOR MICROFILM READER

[75] Inventors: Masaaki Ito, Zama; Yutaka Tanaka, Kawasaki; Nobuo Ueda, Sagamihara; Takanori Saito, Kawasaki; Osami Kato, Kanagawa, all of Japan

[73] Assignee: Minolta Camera Kabushiki Kaisha, Osaka, Japan

[21] Appl. No.: 89,056

[22] Filed: Aug. 25, 1987

Related U.S. Application Data

[63] Continuation of Ser. No. 854,837, Apr. 23, 1986, abandoned.

[30] Foreign Application Priority Data

Apr. 29, 1985 [JP] Japan .................................. 60-91929

[51] Int. Cl.⁴ ...................... G03B 23/12; G03B 27/52; G03B 27/70
[52] U.S. Cl. ................................ 353/26 R; 355/14 R; 355/43; 355/45
[58] Field of Search .................... 253/26 R, 26 A, 25; 355/14 R, 43, 45; 364/900

[56] References Cited

U.S. PATENT DOCUMENTS

| | | | |
|---|---|---|---|
| 3,629,840 | 12/1971 | Cullen | 364/900 |
| 3,949,375 | 4/1976 | Ciarlo | 353/26 A X |
| 4,134,674 | 1/1979 | Ohsaki et al. | 355/45 X |
| 4,139,898 | 2/1979 | Tanaka | 353/26 A X |
| 4,174,891 | 11/1979 | Flint et al. | 353/26 A |
| 4,282,522 | 8/1981 | Everett, Jr. | 353/26 R X |
| 4,327,994 | 5/1982 | Barley et al. | 355/14 |
| 4,572,656 | 2/1986 | Buchalter et al. | 355/24 |
| 4,607,950 | 8/1986 | Ishii et al. | 353/26 A X |
| 4,687,321 | 8/1987 | Itoh | 353/26 A X |
| 4,693,591 | 9/1987 | Saijo et al. | 353/26 R X |

Primary Examiner—Richard A. Wintercorn
Attorney, Agent, or Firm—Burns, Doane, Swecker & Mathis

[57] ABSTRACT

The present invention relates to a reader printer having a plurality of mode selection keys, ten-keys and a character display which displays a message indicating contents of input manipulations to be executed next with the ten keys in accordance with the mode selected by the mode selection keys whereby operating conditions of the reader printer under the selected mode are set by way of operator-to-machine conversation.

9 Claims, 53 Drawing Sheets

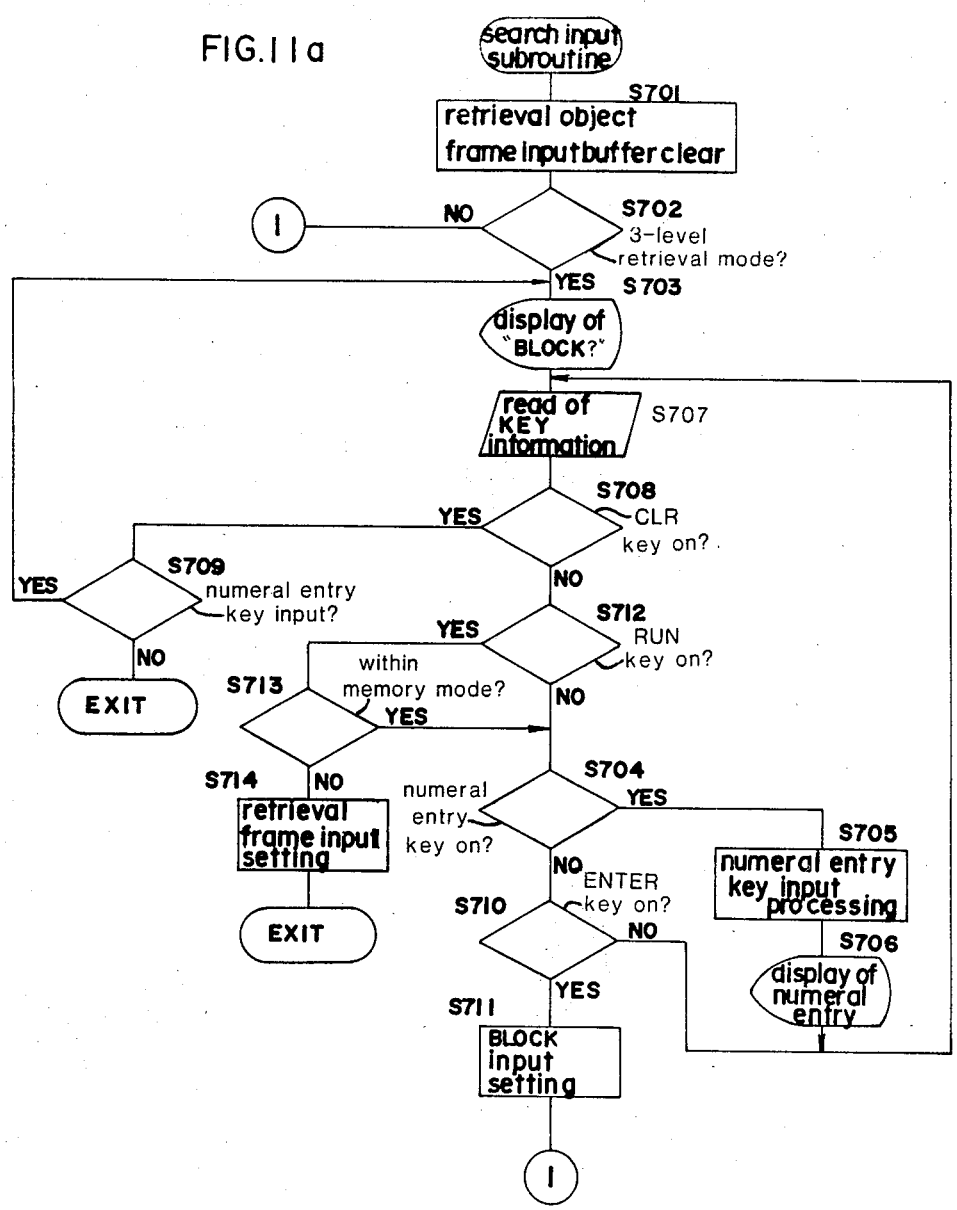

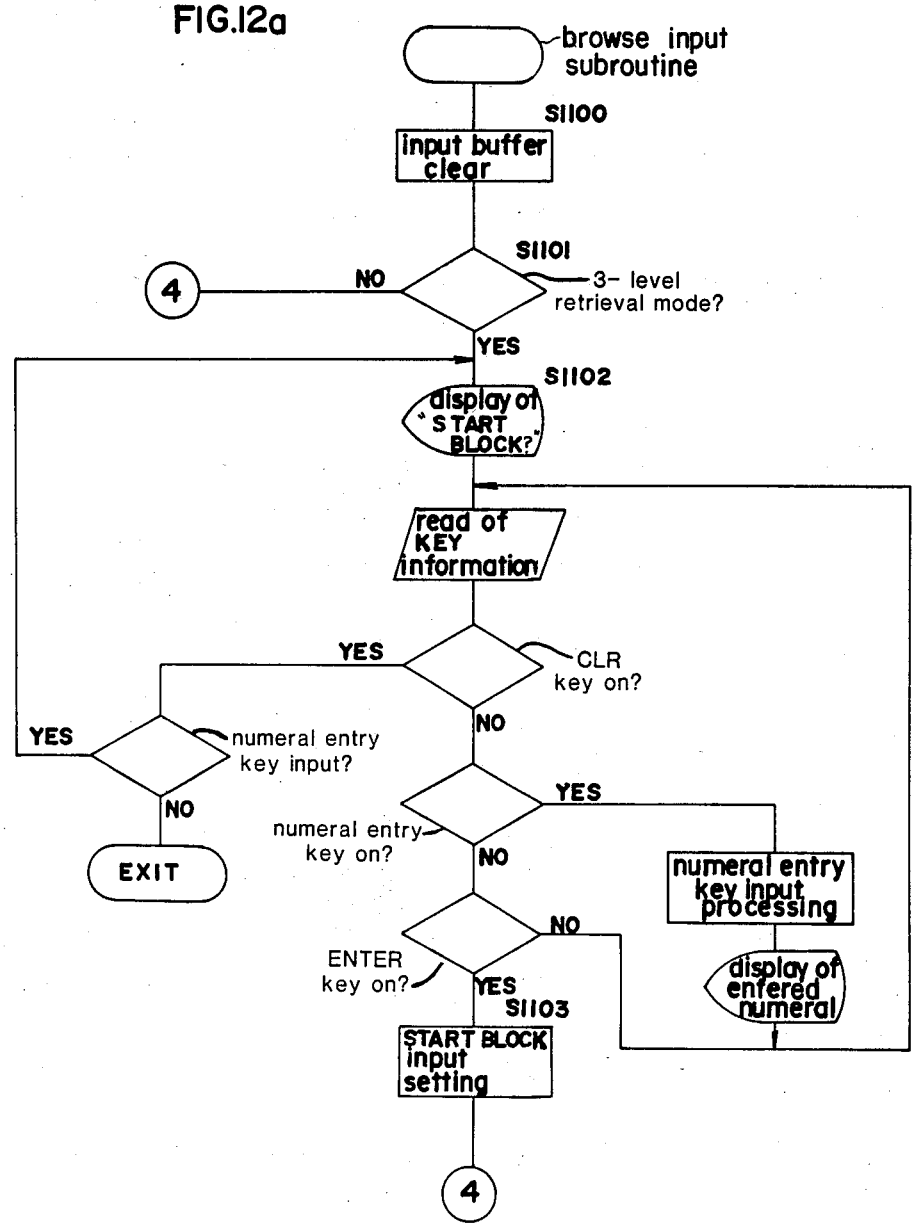

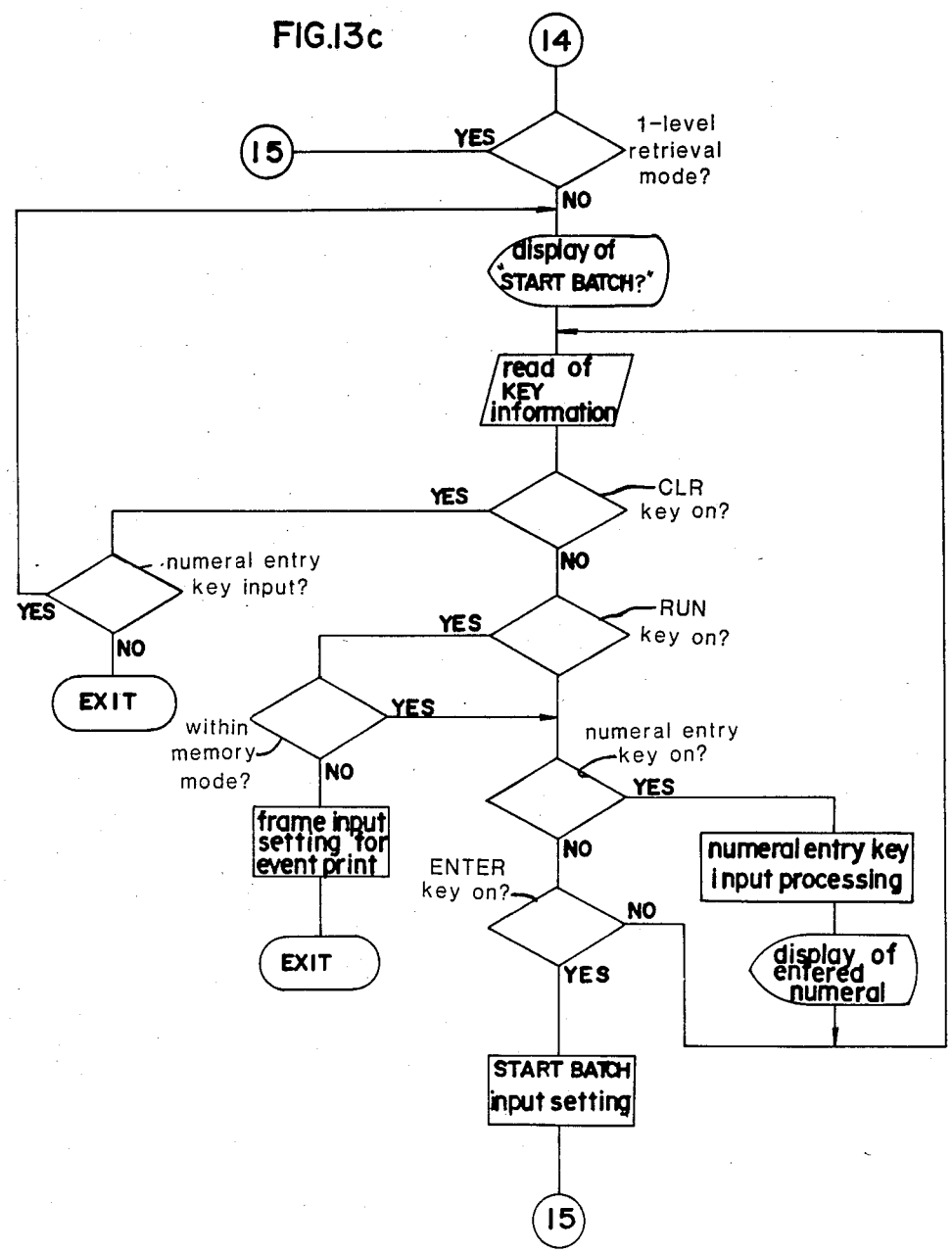

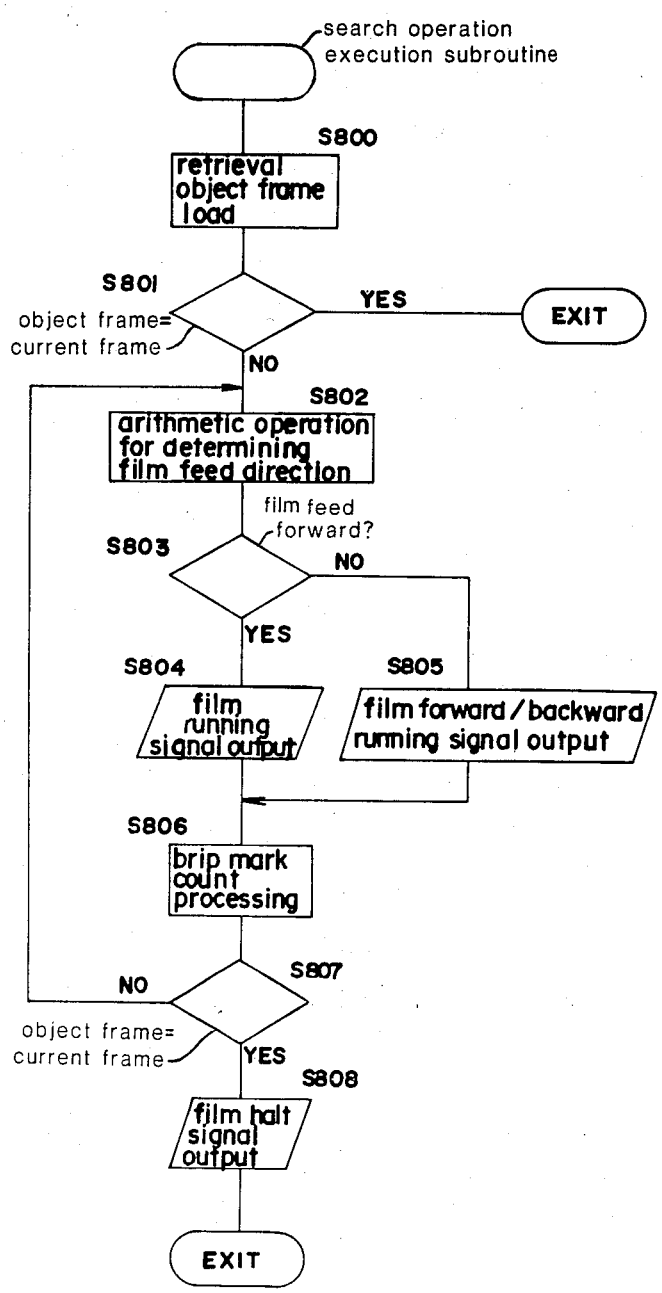

FIG.18a

| | manipulation | display |
|---|---|---|
| ① | [SEARCH]<br>[1] [RUN]<br>(or [ENTER] [RUN]) | PAGE? |
| ② | [SEARCH]<br>[1] [0] [0] [RUN] | PAGE? |
| ③ | [PRINT]<br>[1] [0]   [ENTER]<br>[2] [0] [0] [ENTER]<br>[1] [5] [0] [ENTER]<br>[5] [RUN] | MULTI?<br>START PAGE?<br>END PAGE?<br>EVERY? |
| ④ | [PRINT]<br>[ENTER] (or [1] [ENTER])<br>[1] [0] [0] [ENTER]<br>[1] [5] [0] [RUN] | MULTI?<br>START PAGE?<br>END PAGE? |

FIG. 18b

| | manipulation | display |
|---|---|---|
| ⑤ | [PRINT] <br> [ENTER] <br> [2] [0] [0] [RUN] <br> [PRINT] <br> [RUN] | MULTI ? <br> START PAGE? <br><br> MULTI ? |
| ⑥ | [SET] <br> [5] [0]   [ENTER] <br><br> [REWIND] <br><br> [SET] <br> [1] [0] [0]   [ENTER] <br> [5] [0] [0] [0]   [ENTER] | PAGE ? <br><br><br><br><br> START PAGE ? <br> LIMIT PAGE ? |
| ⑦ | [BROWSE] <br> [2] [0] [0]   [ENTER] <br> [3] [0] [0]   [ENTER] <br> [1] [0]   [ENTER] <br> [5]   [RUN] | START PAGE? <br> END PAGE ? <br> EVERY ? <br> DELAY IS ? |
| ⑧ | [BROWSE] <br> [1] [5] [0]   [ENTER] <br> [2] [0] [0]   [RUN] | START PAGE ? <br> END PAGE ? |

FIG.18c

| | manipulation | display |
|---|---|---|
| ⑨ | PRINT | MULTI ? |
| | 2 0 0 | 200 |
| | CLR/STP | MULTI ? |
| | 1 0   ENTER | START PAGE ? |
| | 1 5 0   ENTER | |
| ⑩ | PRINT | MULTI ? |
| | CLR/STP | |
| ⑪ | PRINT | MULTI ? |
| | 1 0 0   ENTER | START PAGE ? |
| | CLR/STP | |
| ⑫ | PRINT | MULTI ? |
| | 1 0 0 | 100 |
| | CLR/STP | MULTI ? |
| | CLR/STP | |

FIG.18d

| | manipulation | display |
|---|---|---|
| ⑬ | MEMORY<br>ENTER  CLR/STP | |
| ⑭ | MEMORY<br>1 0 0  ENTER | No. 100 |
| | SEARCH<br>5 0 0  ENTER | PAGE ?<br>S 500 |
| | SEARCH<br>1 0 0 0  ENTER | PAGE ?<br>S 1000 |
| | PRINT<br>5  ENTER<br>8 0 0  ENTER<br>7 5 0  ENTER<br>ENTER (or 1 ENTER) | MULTI ?<br>START PAGE ?<br>END PAGE ?<br>EVERY ?<br>P 800 M 5 T 750 E 1 |
| | REWIND<br>CLR/STP | R |

FIG.18e

| | manipulation | display |
|---|---|---|
| ⑮ | [MEMORY] | No. 100 |
| | [2][0][0] [ENTER] | No. 200 |
| | [PRINT] | MULTI ? |
| | [5] [ENTER] | START PAGE ? |
| | [1][0][0] [ENTER] | END PAGE ? |
| | [ENTER] | P 100 M 5 |
| | [BROWSE] | START PAGE ? |
| | [2][0][0] [ENTER] | END PAGE ? |
| | [3][0][0] [ENTER] | EVERY ? |
| | [1][0] [ENTER] | DELAY 1 S ? |
| | [5] [ENTER] | B 200 T 300 E 10 D 5 |
| | [CLR/STP] | |

| | manipulation | display |
|---|---|---|
| ⑯ | [MEMORY] | No. 100 |
| | [→] | S 500 |
| | [→] | S 1000 |
| | [0] [CLR/STP] | |
| | [→] | P 800 M 5 T 750 E 1 |
| | [→] | S 500 |
| | [MEMORY] | No. 200 |
| | [→] | P 100 M 5 |
| | [0] [CLR/STP] | |
| | [PRINT] | START PAGE ? |
| | [1][0][0] [ENTER] | MULTI ? |
| | [1][0] [ENTER] | END PAGE ? |
| | [ENTER] | P100 M 10 |
| | [→] | B 200 T 300 E 10 D 5 |
| | [→] | MEMORY END |
| | [CLR/STP] | |
| ⑰ | [MEMORY] | No. 100 |
| | [→] | S 500 |
| | [RUN] | |
| | | P 800 M 5 T 750 E 1 |
| | [RUN] | |
| ⑱ | [MEMORY] | No. 100 |
| | [0] [RUN] | |
| | [CLR/STP] | |
| | [MEMORY] | |
| | [1] [RUN] | |

FIG.24 a
FIG.24 b
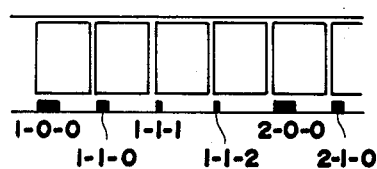
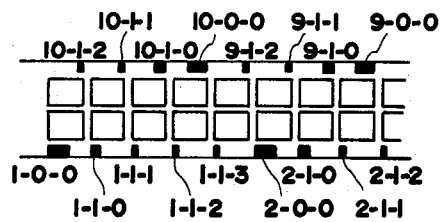
FIG.25
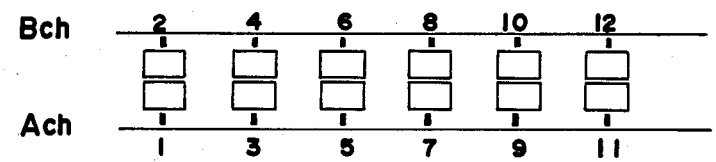
FIG.26
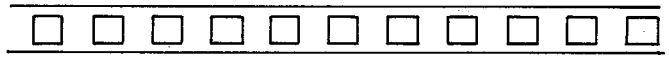

RETRIEVAL CONTROL APPARATUS FOR MICROFILM READER

This application is a continuation of application Ser. No. 854,837, filed Apr. 23, 1986, now abandoned.

BACKGROUND OF THE INVENTION

1. Field of the Invention

The present invention relates to a reader printer which is capable of projecting enlarged micro-film images by retrieving micro-films and duplicating such images, as required, on a recording paper.

2. Description of the Prior Art

A reader printer has already been known as a typical apparatus for projecting enlarged images of microfilms on the screen by feeding and controlling a long-length microfilm through a detection of blip marks and by retrieving a desired frame, and recording data of retrieved frame on a recording medium, for example, on a recording sheet as required. The apparatus of this type is provided with highly automated functions in a plurality of modes for retrieval and duplication.

However, execution of the retrieval and duplication in a plurality of modes requires the instruction input manipulation in accordance with predetermined procedures. Namely, the desired operations are not executed if a determined manipulation procedure is not carried out accurately. But this manipulation procedure is necessarily very complicated because the apparatus of this type is provided with a variety of highly sophisticated intrinsical functions as explained above.

For this reason, only skilled authorized operators can freely enjoy the sophisticated functions of the apparatus. Usually, an ordinary operator can extract only a part of the total functions, namely only extremely simplified functions and cannot enjoy the execution of particualr operation modes or complication retrieval modes without reference to the manipulation manual. In such a case, the keying must be carried out accurately with reference to the manipulation manual and therefore complexity in manipulations has been considered as a serious problem.

SUMMARY OF THE INVENTION

Therefore, it is an object of the present invention to simplify the data input manipulations for anyone who manipulates the apparatus without reference to manipulation manual even for complicated operation modes.

In order to attain such object, the reader printer of the present invention has such a basic characteristic as programming the input manipulations on the basis of man-to-machine conversation by providing a means for designating retrieval/record modes, a manipulation input means, a means for issuing a message which indicates contents of input manipulations to be done next in accordance with mode designation or manipulation input, a display means which displays message and contents of input manipulations and a means for controlling retrieval and record modes based on a series of control commands obtained by repetition of message display and input manipulations of the operator.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 15 is a flowchart indicating detail of Search operation execution subroutine.

DETAILED DESCRIPTION OF THE INVENTION

Figure 1:
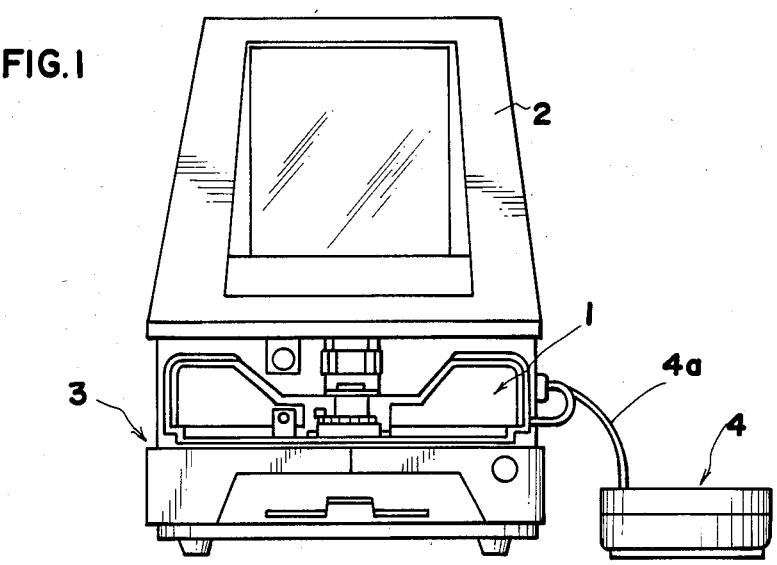
FIG. 1 is a front elevational view illustrating an embodiment of the present invention.

Constitution:

FIG. 1 shows outline of a micro-film reader printer which is primarily composed of a main body or a reader printer comprising a roll carrier (1) which drives a roller micro-film for feeding and rewinding it, a projector (2) which projects enlarged images of the frame of film being set to the predetermined projection area by said roll carrier (1) and a recorder (3) which records the data of the frame projected by the projector (2) on a recording sheet and a keyboard device (4) which is connected, of course, disconnectably to said reader printer through a cord (4a) and issues a variety of instructions to the main body.

Figure 2A:
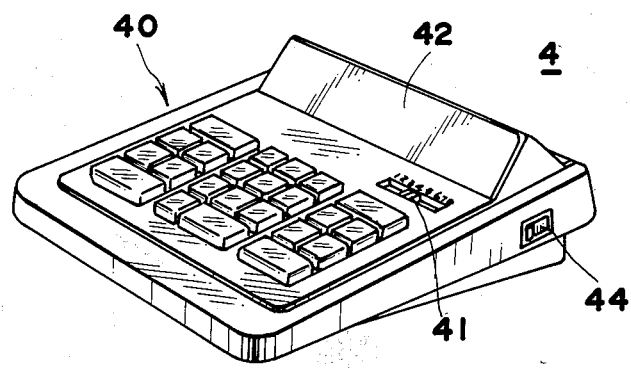
FIG. 2(a) is a perspective view illustrating an embodiment of a keyboard apparatus and FIG. 2(b) is a rear view illustrating an embodiment of the same.
Figure 2B:
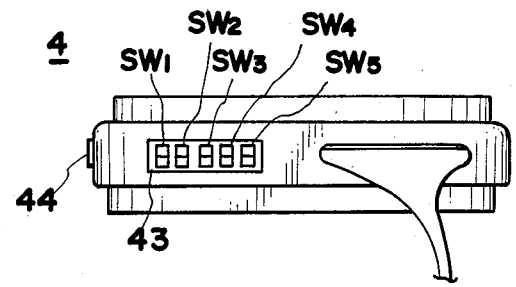

Keyboard device:

The keyboard device (4) is provided, as shown in FIG. 2(a), with a plurality of manipulation keys (40), a slide switch (41) which can be adjusted in eight steps and a display (42). The display (42) displays a message for urging an operator to start input manipulation and also numerals input by the keying. For example, this display is composed of liquid crystal display elements and is capable of displaying messages or others in 16 digits or more. Moreover, as shown in FIG. 2(b), the rear side of this keyboard device (4) is provided in series, for example, with five dip switches (43) in order to selectively switch the basic mode described later. A switch (44) provides at the side surface of said keyboard device (4) a power switch. Respective functions of said switches (41),(43) and manipulation keys (40) are explained later in detail.

Figure 3:
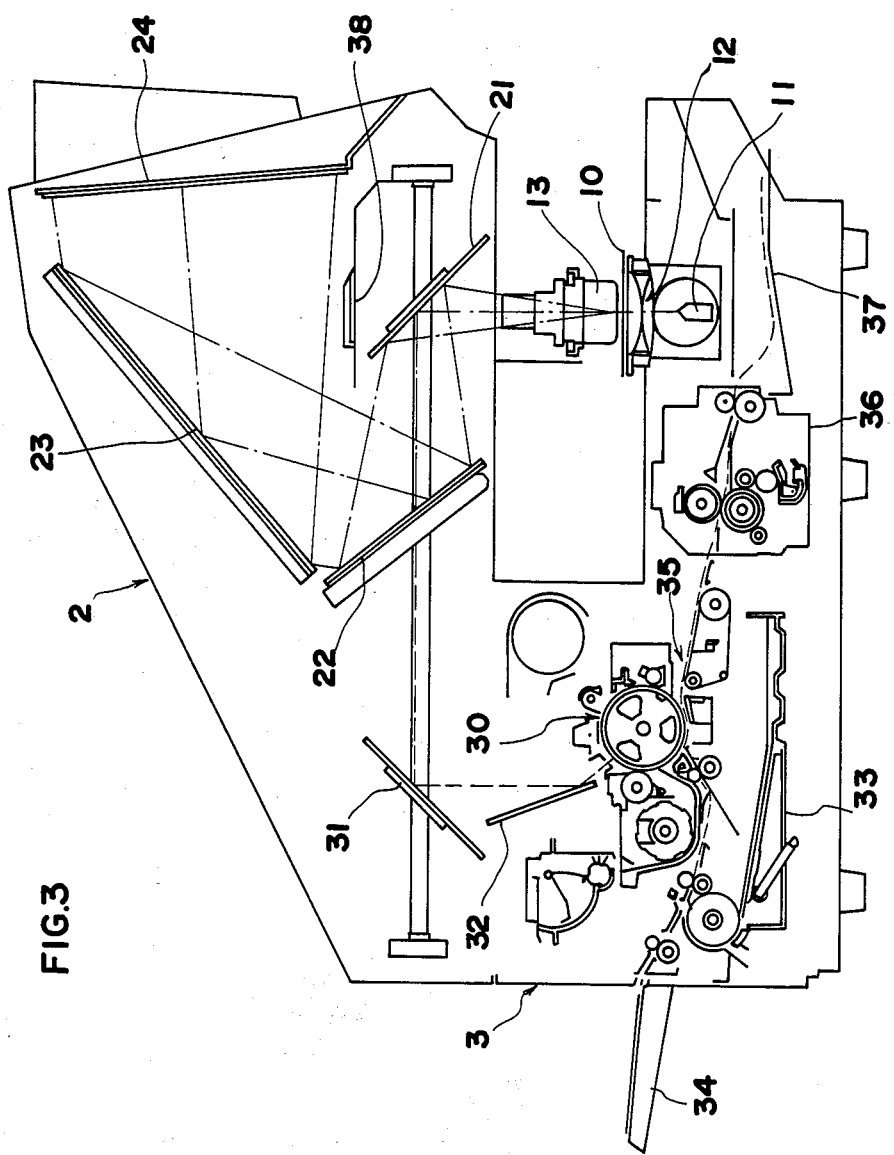
FIG. 3 is a sectional view of the apparatus, FIGS. 4(a), (b) are sectional views for explaining operations during retrieval and recording, respectively.
Figure 4A:
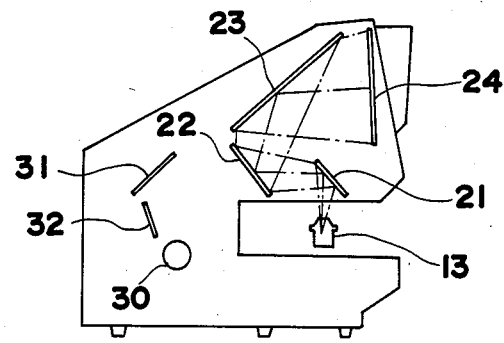

Reader printer:

FIG. 3 is a sectional view of a reader printer. An outline of operations of a reader printer is explained with reference to this figure. A micro-film (10) is illuminated by a projection lamp (11) through a condenser lens (12). An image of this film is enlarged and projected on a screen by a projection lens (13) through a first mirror (21), a second mirror (22) and a third mirror (23). (Refer to FIG. 4(a)).

Figure 4B:
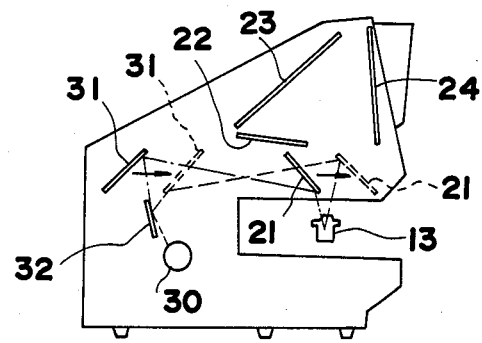

On the other hand, a recorder (3) is of the electrophotographic type providing a photosensitive drum (30) and a micro-film image enlarged by the projection lens (13) is slit-exposed on the photosensitive drum (30). Namely, when the print operation is started, as is also shown in FIG. 4(b), the second mirror (22) moves upward, and a micro-film image is slit-projected on the rotating photosensitive drum (30) through the 5th mirror (32) by the synchronized scanning operations of the 1st mirror (21) and the 4th mirror (31). The photosensitive drum (30) forms a toner image at the drum surface with the known drum periphery element (35) based on the projected image. This toner image is transferred onto a copying sheet supplied from a paper supply cassette (33) or from a manual paper supply table (34). After the image transfer, the copying sheet is discharged to a copy tray (37) through the fixing portion (36). Also provided is the AE (Auto Exposure) mechanism which controls an application voltage of projection lamp (11) to the optimum value for image concentration of the film used before the start of a scanning operation. A plurality of photoelectric sensors (38) to be used for this AE mechanism are provided at the upper side of the 1st mirror (21).

Figure 5:
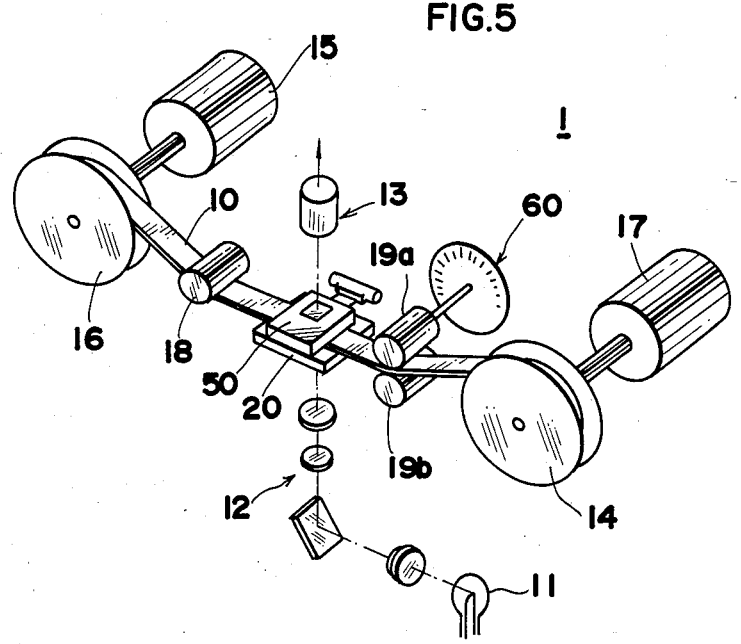
FIG. 5 is a perspective view illustrating an embodiment of the essential part of a roll carrier.

Roll carrier:

An outline of roll carrier (1) is explained with reference to FIG. 5. A micro-film (10) wound to a supply reel (14) is released and rolled up by a wind-up reel (16) which is driven by a wind-up motor (15). The supply reel (14) is also coupled with a rewind motor (17) and this motor is driven in order to rewind the film. The micro-film (10) which can be carried in both normal and reverse directions is guided by a tension roller (18) and pinch roller pair (19a),(19b) and passes the gap between a lower glass (20) and a sensor mechanism (50) which reads the blips. A rotary encoder (60) coupled with the shaft of the pinch roller (19a) is used for detecting the amount of feed of micro-film (10).

Figure 6:
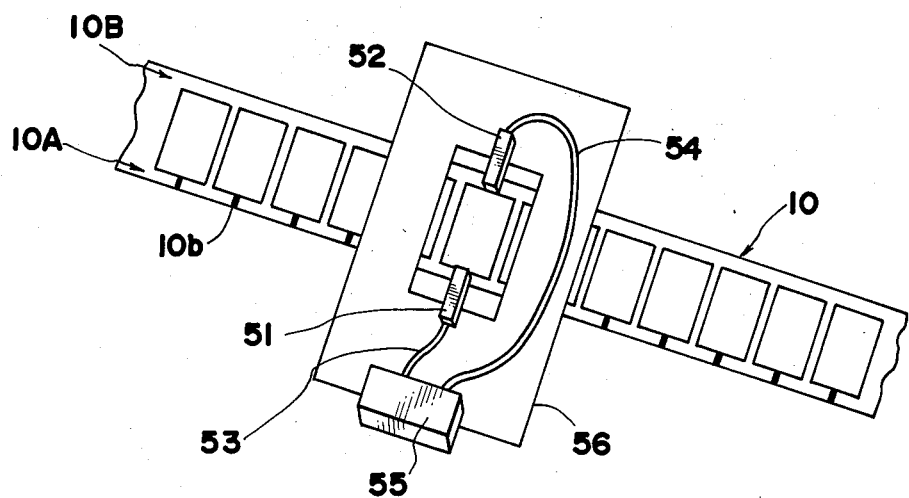
FIG. 6 is a view illustrating an embodiment of the sensor mechanism.

The sensor mechanism (50) comprises, as the essential part is shown in FIG. 6, a pair of photo detectors (51),(52) corresponding to the channel A (10A) where the blip marks (10b) of micro-film (10) are formed and the channel B (10B) where the blip marks are not formed. At these photo detectors (51),(52), the one ends of optical fibers (53),(54) are fixed opposed to the film surface, while the other ends are connected to the pair of photoelectric conversion elements comprised in a sensor (55). The photoelectric conversion elements convert an amount of transmitting light at the channel A (10A) or channel B (10B) of the film which is uniformly illuminated by the projection lamp (11) into electrical signals. A structure (56) providing the photo detectors (51),(52) and the sensor (55) is called a document mark sensor.

Figure 7:
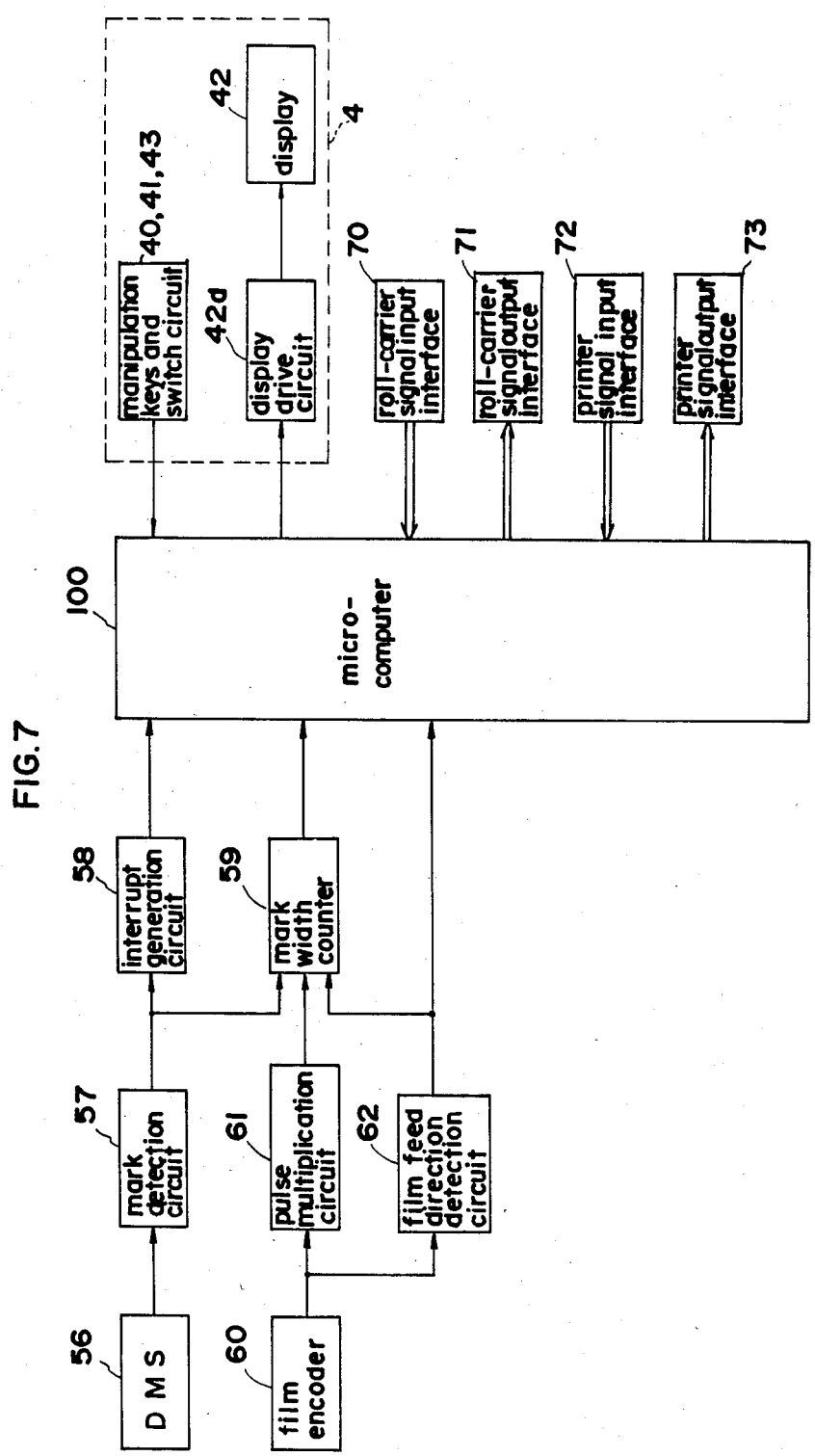
FIG. 7 is a block diagram of the control means of an embodiment including a microcomputer.

Control circuit:

A micro-film reader printer having such constitution is operated and controlled by a control means including a microcomputer (100) as shown in FIG. 7.

In FIG. 7, an output of the document mark sensor (56) (hereinafter referred to as DMS) is input to a mark detection circuit (57). The mark detection circuit (57) shapes the waveform of input signal sent from the photo detectors (51),(52) and outputs a signal for giving a logical level "H" when the document mark, namely the blip mark on the film is located at the position opposed to the photo detectors (51),(52). This output signal is input to an interrupt generation circuit (58) and a mark width counter (59). The interrupt generation circuit (58) generates a pulse signal of short duration when an output of mark detection circuit (57) changes to logical level "L" from "H" and requests an interrupt processing to the microcomptuer (100) with such pulse signal. The microcomputer (100) recognizes passing of a blip mark with such interrupt signal.

On the other hand, a film encoder (60) generates the pulse of two phases including deviation of phases which depends only on the feed rate of film. These 2-phase pulses are input to a pulse multiplication circuit (61) and to a film feed direction detection circuit (62). The pulse multiplication circuit (61) combines the 2-phase signals and multiplies such signals and outputs such multiplied pulse signal to the mark width counter (59). The film feed direction detection circuit (62) detects from time to time the film feed direction from the 2-phase pulses, outputs the detection signal to the microcomputer (100) and also outputs it to the mark width counter (59).

The mark width counter (59) connected to the predetermined input port of microcomputer (100) is initialized when an output of the mark detection circuit (57) changes to the logical level "H" for "L", activating the count operations only during the period of logical level "H". When the count operation is activated, an output pulse signal of the pulse multiplication circuit (61) is counted in the direction of addition or subtraction in accordance with an output signal of the film feed direction detection circuit (62). The counted value is held during the logical level L of output of the mark detection circuit (57).

When the circuit (58) generates an interrupt signal due to passing of the blip mark, the microcomputer (100) intercepts the processings under execution and fetches the contents of mark width counter (59). Such fetched data relates to the width of a blip mark having passed, the microcomputer (100) recognizes with such data the size (large, intermediate or small) and passing direction of a blip mark. After confirming the feed direction with reference to the output signal of the film feed direction detection circuit (62), one (1) is added (+1) or subtracted (−1) to/from the counted value of the mark counter within the microcomputer (100) corresponding to the blip size. Upon completion of such interrupt processing, the microcomputer (100) starts again the intercepted processing.

In FIG. 7, (70),(71) denote the interfaces between the film driver of roll carrier device (1) and the microcomputer (100), said microcomputer outputs a film drive signal through the roll carrier signal output interface (71) while watching the input signal from the roll carrier signal input interface (70). The interfaces (72),(73) are for respective operation elements of a printer, namely the recorder (3) of the electrophotographic type copying system. As explained above, the microcomputer (100) controls the print operation of the printer signal output interface (73) while watching the input signal from the printer signal input interface (72). The film drive control and print operation control of an electrophotographic copying system by the microcomputer (100) are well known and these are not explained here.

The microcomputer (100) is also connected with the keyboard device (4) through the predetermined input-/output ports. The digital signals required for retrieval are input to the microcomputer (100) from the manipulation keys and switch circuits (40),(41) and (43). When a particular key among the manipulation keys (40) is manipulated, the microcomputer (100) responds to such operation and a particular data is displayed by the display (42) through the display drive circuits (42d). The display (42) realizes the display of letters, numerals and symbols, etc.

Figure 8:
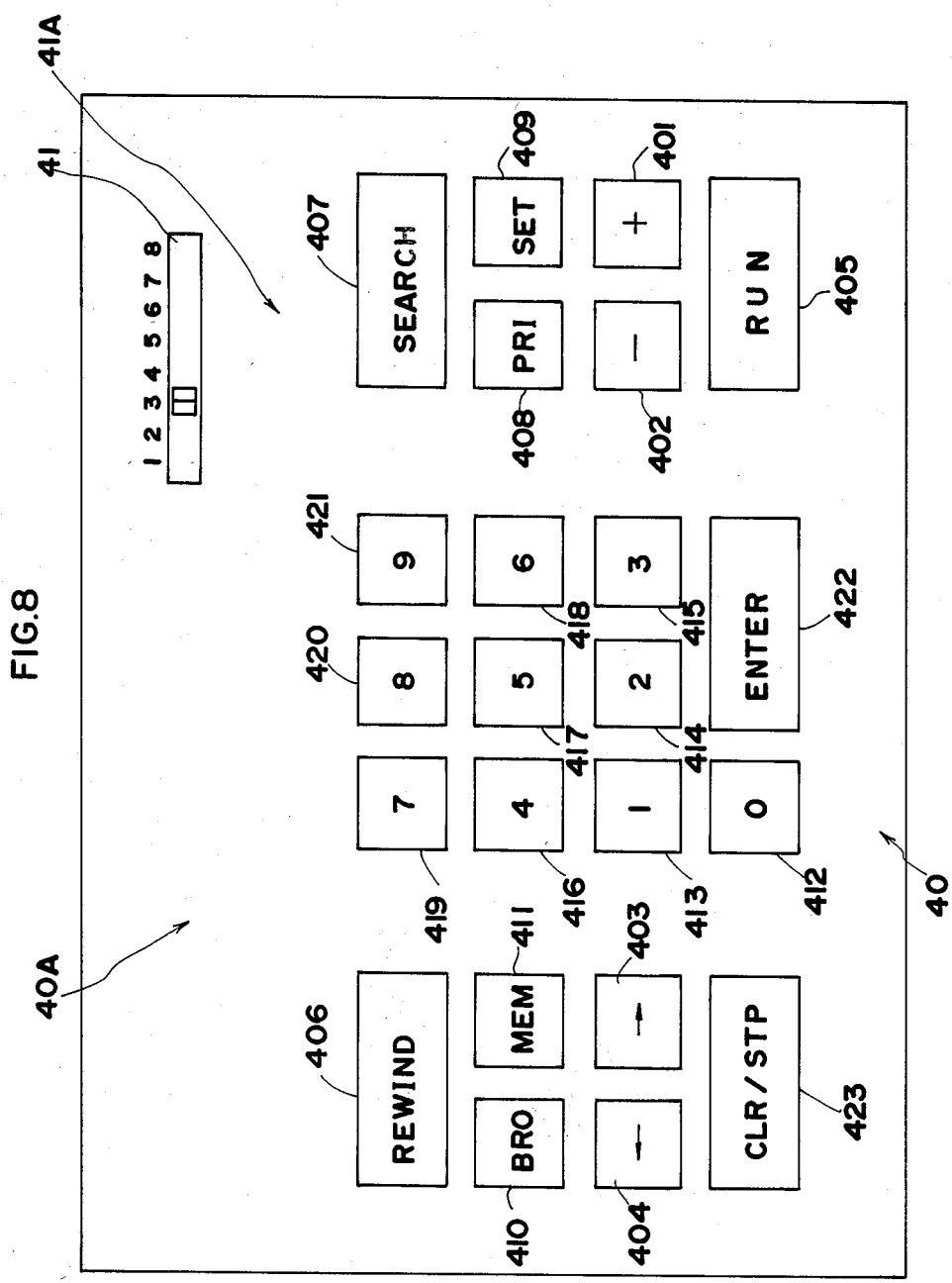
FIG. 8 is an enlarged view illustrating an embodiment of key a arrangement of the keyboard.

Description of functions:

FIG. 8 shows enlarged view of manipulation part of keyboard device (4). With reference to this figure and FIG. 2(b), functions of switches and keys are previously explained hereunder in view of easily understanding the flowcharts of control operation of input processing by keying described later.

[1] Retrieval mode

The slide switch (41) of eight steps is provided for selecting the retrieval modes 1-8 based on the film mode.

Figure 19A:
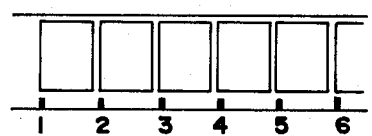
Figure 19B:
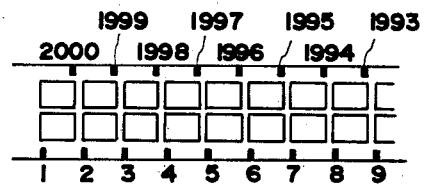

(1) The mode 1 which is set by setting the switch to the position "1" corresponds to the page retrieval of channel A (hereinafter the channel is abbreviated as ch) of the micro-film of the Simplex format (hereinafter referred to as Simplex film) shown in FIG. 19(a) and the page retrieval of Duo format (hereinafter referred to as the Duo film) shown in FIG. 19(b). As the function, the blip marks of A-ch are counted up in the forward direction. In case the blip mark is found also in the B-ch, (i) if the limit of B-ch (2000 in the case of FIG. 19(b)) is preset the blip mark of B-ch is counted down simultaneously with the count-up of the blip mark of A-ch, (ii) if the limit of B-ch is not preset, count is continued up to the end of blip marks of A-ch and then count is then carried out for the blip marks of B-ch.

Figure 20A:
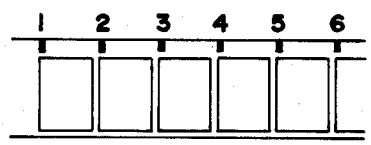
Figure 20B:
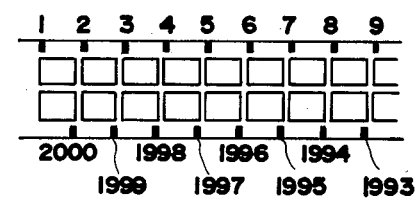

(2) The mode 2 corresponds to the page retrieval of B-ch of Simplex film shown in FIG. 20(a) and the page retrieval of Duo film shown in FIG. 20(b). Namely, the A-ch and B-ch in the mode 1 are interchanged in this mode.

Figure 21:
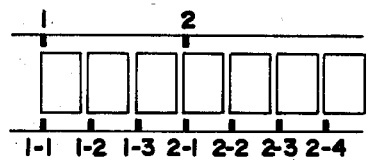

(3) The mode 3 corresponds to the file retrieval. As shown in FIG. 21, counting is conducted considering the blip mark of A-ch as the page, and blip mark B-ch as the file.

Figure 22:
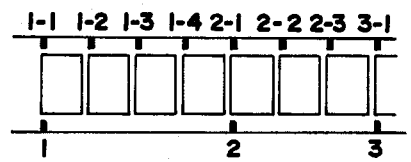

(4) The mode 4 corresponds to the file retrieval. As shown in FIG. 22, the A-ch and B-ch of mode 3 are interchanged in this mode.

Figure 23A:
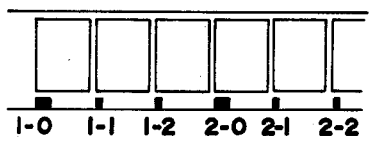
Figure 23B:
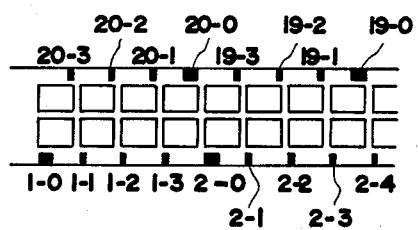

(5) The mode 5 corresponds to the 2-level retrieval mode for conducting the retrieval by utilizing the blip marks in two sizes. In the case of the Simplex film shown in FIG. 23(a), count is conducted considering the large blip mark of A-ch as the file and the small blip mark as the page. Meanwhile, in the case of Duo film shown in FIG. 23(b), (i) if the limit of B-ch (20-3 in FIG. 23(b)) is preset, the blip marks of B-ch are counted down simultaneously with count-up of the blip marks of A-ch, (ii) if the limit of B-ch is not preset, the blipl marks of A-ch are counted up to the end and thereafter the count is reversed to count continuously the blip marks of B-ch.

(6) The mode 6 corresponds to the 3-level retrieval mode for conducting the retrieval by utilizing blip marks in three sizes. In the case of Simplex film shown in FIG. 24(a), count is conducted considering the larger blip marks of A-ch as the block, intermediate blips marks as the file and small blip marks as the page. Meanwhile, in the case of Duo film shown in FIG. 24(b), (i) if the limit of B-ch (10-1-2 in FIG. 24(b)) is preset, the blip marks of B-ch are counter down simultaneously with the count-up of blip marks of A-ch, (ii) if the limit of B-ch is not preset, the blip marks of A-ch are counted up to the end and thereafter count is reversed and the blip marks of B-ch are counted up continuously.

The mode 7 and the mode 8 are not particularly specified in this embodiment. If these modes are used, for example, the mode 7 can be set corresponding to the Duplex retrieval, while the mode 8 can be set to the odometer retrieval. As shown in FIG. 25, the Duplex retrieval is carried out for the microfilm of a Duplex format and the count is carried out considering the blip marks of A-ch as the numbers of front surface images while the blip marks of B-ch as the numbers of rear surface images. The odometer retrieval is carried out, as shown in FIG. 26, for the film having no blip marks. This retrieval is based on the amount corresponding to a feed amount of film of 1:1, namely on the counting of the output pulses of the encoder.

It is also allowed that the mode of film is indicated clearly, for examle, by directly printing or attaching a seal on the panel surface (41A) at the lower side of the slide switch (41) shown in FIG. 8, corresponding to the mode numbers "1" to "8". It is very convenient to know the correspondence of modes even without referring to the manual.

[2] Basic Mode

The dip switch (43) shown in FIG. 2(b) is a change-over switch for selecting a standard operation mode.

(1) The switch ($SW_1$) is used to change the polarity of film, namely for selection of positive and negative films.

(2) The switch ($SW_2$) is used to select the 1st mode for sequentially copying the recording process to the copying sheet in accordance with the frame from larger to small numbers of microfilm or the 2nd mode for sequentially copying in accordance with the frame from smaller to larger numbers of microfilm.

(3) The switch ($SW_3$) is used to select the sort mode or non-sort mode for the group copying of a plurality of copies. For example, in case the 1st file has 50 pages, when a total of 10 copies are required for this 1st file, copying is carried out sequentially sheet by sheet in the sort mode from the page 1-50 (50th page of 1st file) to the page 1-1 (1st page of 1st file) and such copying is repeated 10 times. Meanwhile, in the non-sort mode, 10 copies are carried out continuously for each frame from the page 1-50 to page 1-1.

(4) The switch ($SW_4$) is used to change the blip mark identification criterion in the 2-level retrieval mode. Namely, since the blip marks of 2-level film are used in various combinations of sizes such as large and intermediate blip marks or intermediate and small blip marks, this switch is used to set the identification criterion between the large and intermediate blip marks or between the intermediate and small blip marks.

(5) The switch ($SW_5$) is used to reset the particular blip mark counter within the microcomputer (100) in accordance with the retrieval mode. In other words, this switch is used to select retrial of counting for small blip marks by detection of intermediate blip marks or select continuation of counting for small blip marks without relation to detection of intermediate blip marks.

It is also convenient for these switches (SW$_1$) (SW$_5$) to previously give the display indicating schematically the functions of them in the vicinity of respective switches.

[3] Description of Key Manipulation

Each key (40) shown in FIG. 8 is explained in accordance with the function. The keys can be sorted as the 1 Action Key which carries out the feed of film and step-feed of memory, 2 Command Key which instructs the ration mode, 3 Entry Key which sets input data, and 4 other control keys.

(1) The Action key includes the key (401) given the designation "+", the key (402) given the designation "−", the jog control keys (403) and 404) given the designations "→","←", the command execution key (405) given the designation "RUN" and the film rewind key (406) given the designation "REWIND".

The "+" key (401) has the functions for setting the heading for the rewind condition, relatively sending the frames of film in the forward direction and extending the display time during the Browse operation described later. In the relative sending of frames, for example, the film makes forward transfer as long as 50 frames when the keys "5","0","+" are depressed.

The "−" key (402) has the function for relatively sending the frames of film in the backward direction. For example, when the keys "1","0","−" are depressed, the film makes backward transfer as long as 10 frames.

The "→" key (403) has the function for sending a film in the forward direction at a low speed and while this key is being depressed, the same operation is continued. In case the memory is required to survey the contents, this key realizes the scroll-up. The scroll-up function of memory may be realized by the "+" key (401) in place of the "−" key.

The "←" key (404) has the function of sending a film in the backward direction at a low speed. When this key is being depressed, the same operation is continued. In case the memory is required to survey the contents, this key realizes the scroll-down. The scroll-down function of memory may be realized by the "−" key (402) in place of the "←" key.

The "RUN" key (405) has the function for execution or reexecution of a memory mode described later, in addition to execution of commands.

(2) The command key includes the retrieval setting key (407) given the designation "SEARCH", the print operation setting key (408) given the designation "PRI", the frame number correction setting key (409) given the designation "SET", the skip read retrieval, namely Browsing operation setting key (410) given the designation "BRO" and the memory mode setting key (411) given the designation "MEM". The Browsing operation means the retrieval operation which indicates a frame of microfilm for the specified period with the designated block interval, batch interval or item interval. The details of this operation is described later.

In more detail, the SET key (409) is operated for presetting a heading page number, or presetting a limit number for DUO film or changing a page of current display.

(3) The entry key includes the ten-key (412)∼(421) for setting numerals given the designation of numeral from "0" to "9", the enter key (422) for loading numeral data set by the ten-key to the key microcomputer (100) given the designation "ENTER". The entry keys (412)∼(422) are used to sequentially give the responses to the messages displayed on the display (42).

(4) As for the other control key, the key (423) given the designation "CLR/STP" is also provided. This key (423) realizes alteration of input, halt of operations, erasure of memory contents and halt of manipulations.

Upon actual use of the keyboard device (4), each switch (SW$_1$)∼(SW$_5$) of dip switch (43) is set first and next any of the modes 1∼8 is selected by the slide switch (41). In actual operations, any one of said command keys is depressed. Thereby, a message is displayed on the display (42) in the form of question, urging an operator to input data requried for desired operation in accordance with a preset retrieval mode. When an operator inputs sequentially the responses to such message with the ten-key (412)∼(421) and the ENTER key (422), the necessary data can all be input. Actually, operations are started when the RUN key (405) is depressed. However, in the case of frame number correction, a film is not actually moved and therefore entry of data by the RUN key is unnecessary.

Said MEM key (411) is used for entering the memory mode and assures reservation of programs for retrieval operations. The manipulations for realizing such operations are carried out in the same way as the input by ordinary man-machine-conversation. The operation can easily be programmed only by proceeding the entry by depressing the SEARCH, PRI, BRO keys (407), (408),(410) after depressing the MEM key (411). It makes a difference between the apparatus of prior art where only the numerals are sequentially stored in the registers and the apparatus of the present invention where the retrieval procedure itself can be programmed and the content of the program can be referred for each line or each frame by the "+" key (401) and "−" key (402). Total deletion, partial deletion and addition of a program can also be realized easily.

In FIG. 8, the manipulation capability can be further improved by attaching a display of basic manipulation procedures to the panel surface (40A) at the upper part of manipulation key (40).

Description of Controls:

The key input process control under the program in the microcomputer (100) shown in FIG. 7 is explained with reference to the flow charts shown in FIG. 9 to FIG. 17.

(1) Key input process

Figure 9:
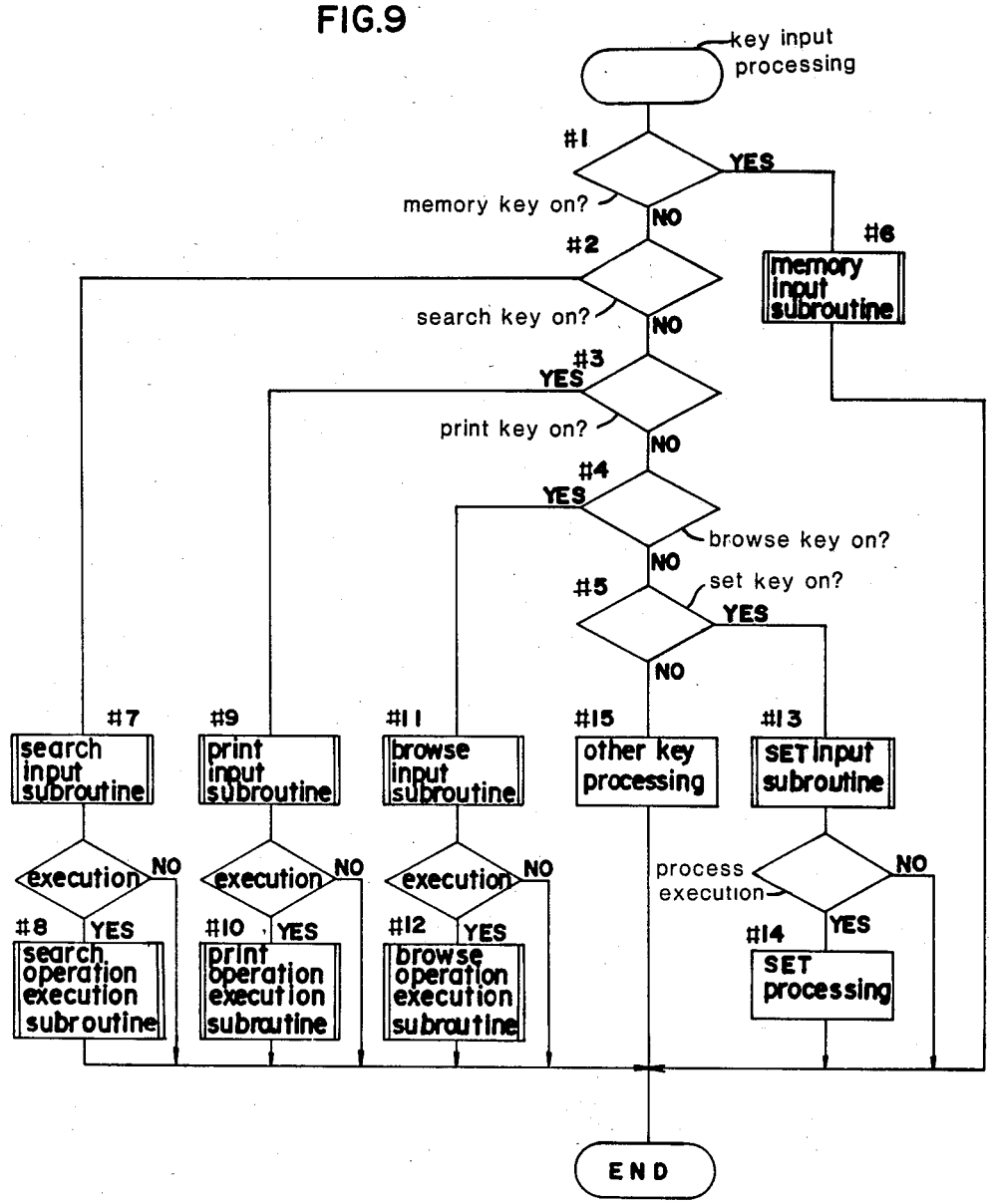
FIG. 9 is a flowchart indicating the main routine of input processings by keying.

FIG. 9 shows the main routine of the key input process.

In the step(#1), when it is judged that the Memory key namely the MEM key (411) is turned ON, operation proceeds to the step (#6) and a memory input subroutine is executed. Details of this subroutine are explained in FIG. 10.

When the Search key namely the SEARCH key (407) is turned ON in the step (#2), operation proceeds to the step (#7) and the Search input subroutine is executed. Details of this subroutine are explained in FIG. 11. When the Search input subroutine (#7) is executed, operation proceeds to the step (#8) and the Search operation execution subroutine is executed for actual operation. Details of this subroutine are explained in FIG. 15.

When it is judged that the Print key namely the PRI key (480) is set to ON in the step (#3), operation proceeds to the step (#9) and the Print input subroutine is executed. Details of this subroutine are explained in FIG. 13. When the Print input subroutine (#9) is executed, operation proceeds to the step (#10) and the Print operation execution subroutine is started for actual operations. Details of this subroutine are explained in FIG. 17.

When the Browse key namely the BRO key (410) is judged to be set to ON in the step (#4), operation proceeds to the step (#11), the Browse input subroutine is executed. Details of this subroutine are explained in FIG. 12. When this Browse input subroutine (#11) is executed, operation proceeds to the step (#12) and the Browse operation execution subroutine is started for actual operations. Details of this subroutine are explained in FIG. 16.

When the SET key namely the SET key (409) is judged to be set to ON in the step (#5), operation proceeds to the step (#5) and the SET input subroutine is executed. Details of this subroutine are explained in FIG. 14. When the SET input subroutine (#13) is executed, operation proceeds to the step (#14) and the SET process operation is carried out. If the keys other than those described above are manipulated, a predetermined process is carried out for the relevant key entry in the step (#15). When the processing is completed, this main routine terminates.

Figure 10:
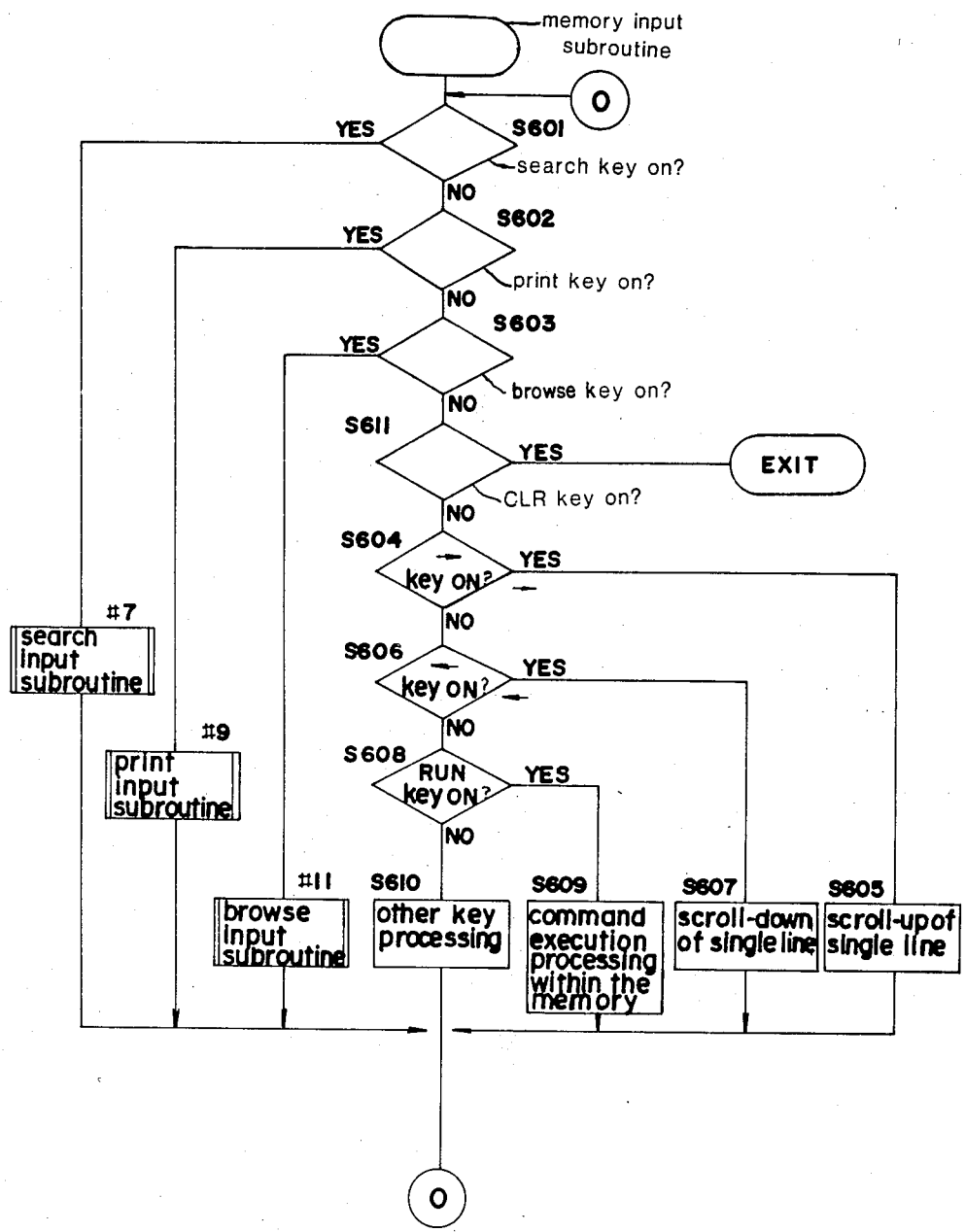
FIG. 10 is a flow chart indicating detail of the Memory input subroutine, FIGS. 11 (a-c) show the flowcharts indicating detail of Search input subroutine, FIGS. 12 (a-j) show the flowcharts indicating detail of Browse input subroutine, FIGS. 13 (a-k) show the flowcharts indicating detail of Print input subroutine, FIGS. 14 (a-g) show the flowcharts indicating detail of Set input subroutine.

(2) Memory input subroutine:

FIG. 10 is a flow chart indicating details of the Memory input subroutine.

The Search key is discriminated to be set to ON in the step (S601), the Search input subroutine (#7) is executed. When the Print key is discriminated to be set to ON in the step (S602), the Print input subroutine (#9) is executed. When the Browse key is discriminated to be set to ON in the step (S603), the Browse input subroutine (#11) is executed. When execution in any of these subroutines is completed, operation returns to the step (S601) and this routine is repeated.

When the jog key "→" is discriminated to be set to ON in the step (S604), operation proceeds to the step (S605) and content of memory is scrolled up for one line namely for one step. When the jog key "←" is discriminated to be set to ON in the step (S606), operation proceeds to the step (S607) and memory content is scrolled down for one line.

In the step (S608), when the RUN key is discriminated to be set to ON, operation proceeds to the step (S609) and the commands in the designated memory are executed. When operations of steps (S605),(S606), (S609) are completed, operation returns to the step (S601).

When any foregoing key is not manipulated, the processing corresponding to the other key manipulated in the step (S610) is executed and after this processing, operation returns to the step (S601). This subroutine can be intercepted by manipulating the CLR/STP key. Namely, when the CLR key is designated to be set to ON in the step (S611), operation returns to the main routine of FIG. 9 through the exit (EXIT).

(3) Search input subroutine

Figure 11B:
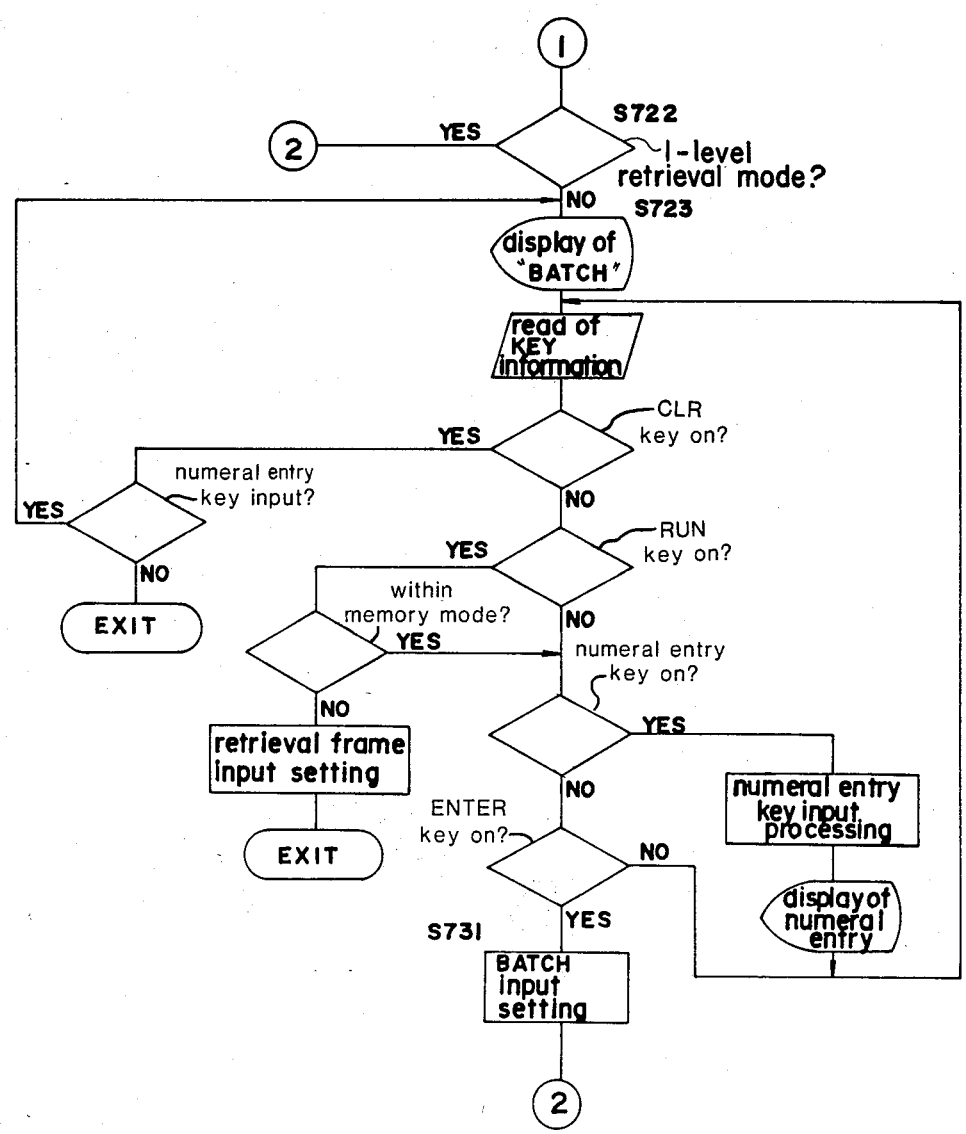
Figure 11C:
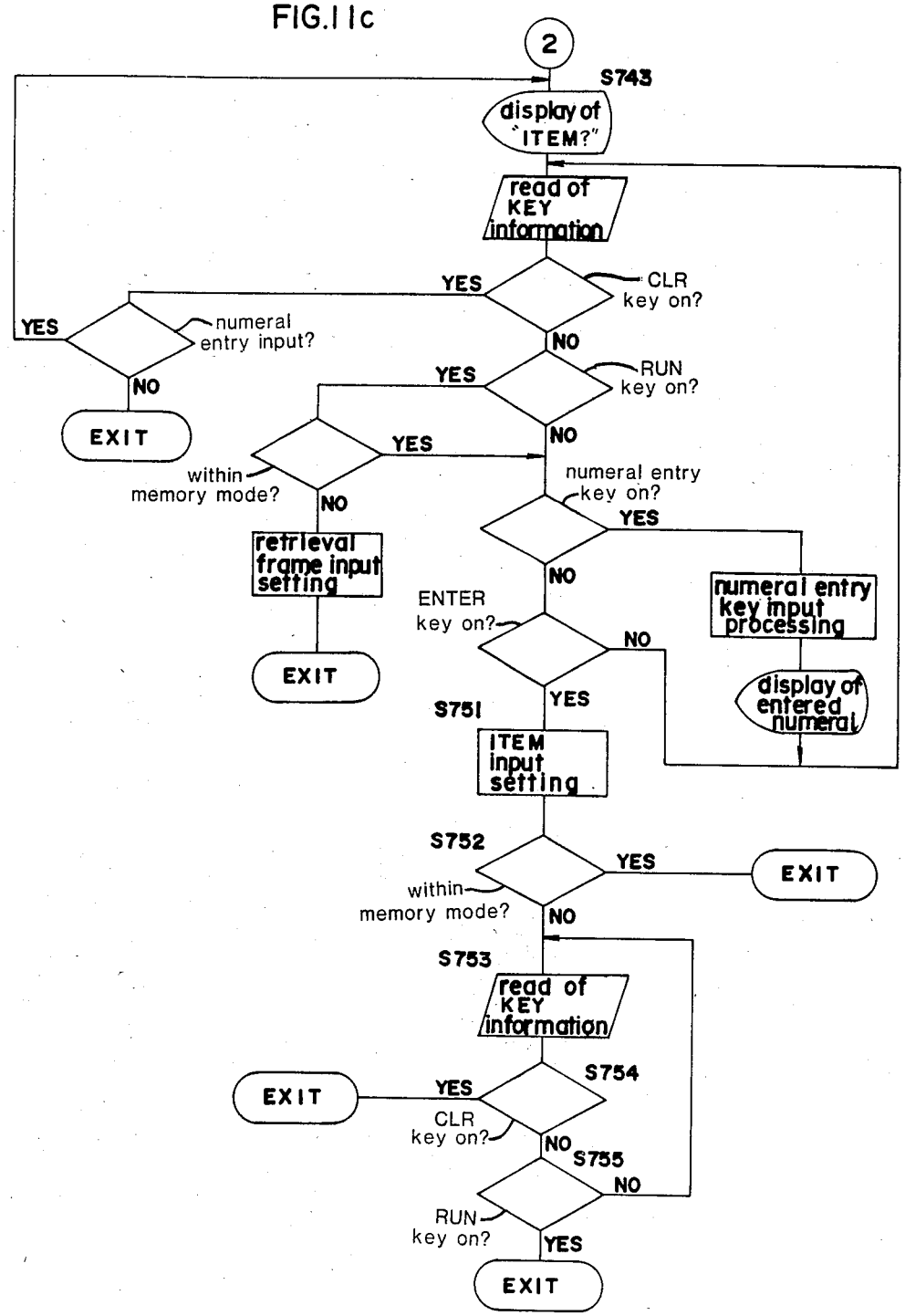

FIG. 11 is a flowchart indicating details of the Search input subroutine.

When this subroutine starts, a retrieval object frame input buffer in the RAM of the microcomputer is first cleared in the step (S710). The retrieval mode is judged in the next step (S702). In the case of 3-level retrieval mode, an inquiry message "BLOCK?" is displayed on the display (42) in the step (S703) in order to designate a value of block corresponding to the large blip mark. In this case, key data is read in the step (S707), which key has been manipulated is stored in the buffer for backup memory. When a numeral entry key is manipulated, the step (S704) answers YES, a numeral corresponding to a numeral entry key manipulated is stored in the buffer for numeral entry and, this value is displayed in the step (S706) and operation flow returns to the step (S707). Meanwhile, when the CLR key namely CLR/STP key (423) is manipulated, operation moves to the step (S709) and when data is already input by the numeral entry key, operation moves to the step (S703), resulting in the display of "BLOCK?" again. Thereby, a numeral which has been input can be corrected. When the CLR key is depressed in case there is no input by the numeral entry key in the step (S709), this retrieval command input itself is cancelled. Namely, operation returns to the main routine of FIG. 9 from the step (S709) and the command data is cleared in a program of large scale including this main routine. Operations for cancelling this command input are the same also in the Print, Browse and SET input subroutines described later.

When numeral entry is completed and the ENTER key is discriminated to be set to ON in the step (S710), a block value is input in the step (S711). Namely, the block value entered is stored in said object frame input buffer.

On the other hand, as the particular operation in this embodiment, successive inputs can be omitted by depressing the RUN key withoout perfectly executing the input by keying operation. Namely, when the RUN key is discriminated to be set to ON in the step (S712) and the memory mode discriminated not to be set in the step (S713), operation flow moves to the retrieval frame input in the step (S714). When this step is executed, BATCH corresponding to an intermediate blip mark and ITEM corresponding to a small blip mark to be set in the succeeding steps are automatically set to "0". When the executable subroutine (#8) is started under this condition, operations for projecting the heading frame of designated block on the screen or print operation is carried out. In this case, if the block is not designated by the numeral entry key, the heading frame of the block to which the frame halting currently belongs is searched.

When the ENTER key is depressed, operation proceeds to the next sequence. However, in this case, if a block is not designated by the numeral entry key, belongs is stored in said retrieval object frame input buffer.

In FIG. 11(b), the 1-level retrieval mode is discriminated in the step (S722). If not, "BATCH?" is dislayed in the step (S723), urging an operator to input data. When a batch value of the search object frame is input with the numeral entry key and the ENTER key is depressed, the input value is set to the input buffer in the step (S731). If an input is not designated with the numeral entry key, a value of of batch to which the frame halting and projected currently belongs is input. The succeeding inputs can be omitted by depressing the RUN key. In this case, ITEM is set to "0". Thereby, the heading frame of the designated batch in the designated block is searched.

In FIG. 11 (c), "ITEM?" is displayed in the step (S743). When an item value of the search object frame is input with the numeral entry key and the ENTER key is depressed, the input value is set to the input buffer in the step (S751). If input is not designated here with the numeral entry key, an item value of current frame is input. Input is also possible with the RUN key.

At the termination of input, it is discriminated wether operation is in the memory mode or not in the next step (S752). Moreover, it is also watched whether the CLR key is set to ON or the RUN key is set to ON or not in the step (S753). When the RUN key is set to ON, this input routine comes to an end and the search operation is started.

In case the retrieval mode is set to 2-level, said input procedures are started from the step (S723) but from the step (S743) in the case of a 1-level mode. In case this search input manipulation processing is carried out in the memory mode, since it is not allowed that the operation is started immediately by omitting the inputs by the RUN key, it is checked in the steps (S713) and (S752), etc.

The control for automatically setting an automatic setting value or ASV by omitting the input with the numeral entry key is carried out not only in the Search input subroutine described above but also in the other input subroutines described later. Contents of such controls are indicated below. In the part of the disclosed flow chart with the designation of "... input setting" an input is carried out with the numeral entry key by which the input value becomes effective. If the numeral input is omitted, the automatic setting value is effective.

(1) Automatic setting when the ENTER key is set to ON:

ASV for the frame number is the current frame value.

ASV for a display time to be set in the Browse mode is a preceding setting value. However, the ASV is 1 second at the time of turning ON the power switch.

ASV for a number of sheets to be copied (MULTI) is only one sheet.

ASV for a skip read interval (INTERVAL ... ) is a previous setting value. However, the ASV is 1 ITEM at the time of turning ON the power switch.

(2) Automatic setting when the RUN key is set to ON:

(In the case of Search input)

ASV for the BLOCK processing is the heading frame of the designated block.

ASV for the BATCH processing is the heading frame of the designated block and the designated batch.

ASV for the ITM processing is the frame being projected.

(In the case of Print input)

As to the MULTI processing, a current frame is input.

As to the START BLOCK, the group copy mode within the designated block is input.

As to the START BLOCK, the group copy mode of the designated batch of the designated block is input.

As to the START ITM, the single copy mode of the frame of the designated item of the designated batch of designated block is input.

In any case of END BLOCK, END BATCH and END ITEM, the through print mode of the current frame is input.

(In the case of Browse input)

Input of the RUN key is not accepted for "START . . . ".

(4) Browse input subroutine:

Next, details of Browse input subroutine is explained with reference to FIG. 12.

An input buffer is cleared in the step (S1100) and the retrieval mode is designated in the step (S1101). In the case of a 3-level retrieval mode, "START BLOCK?" is displayed in step (S1102). A value of the start block is input in the step (S1103) by manipulating the numeral entry key.

Figure 12B:
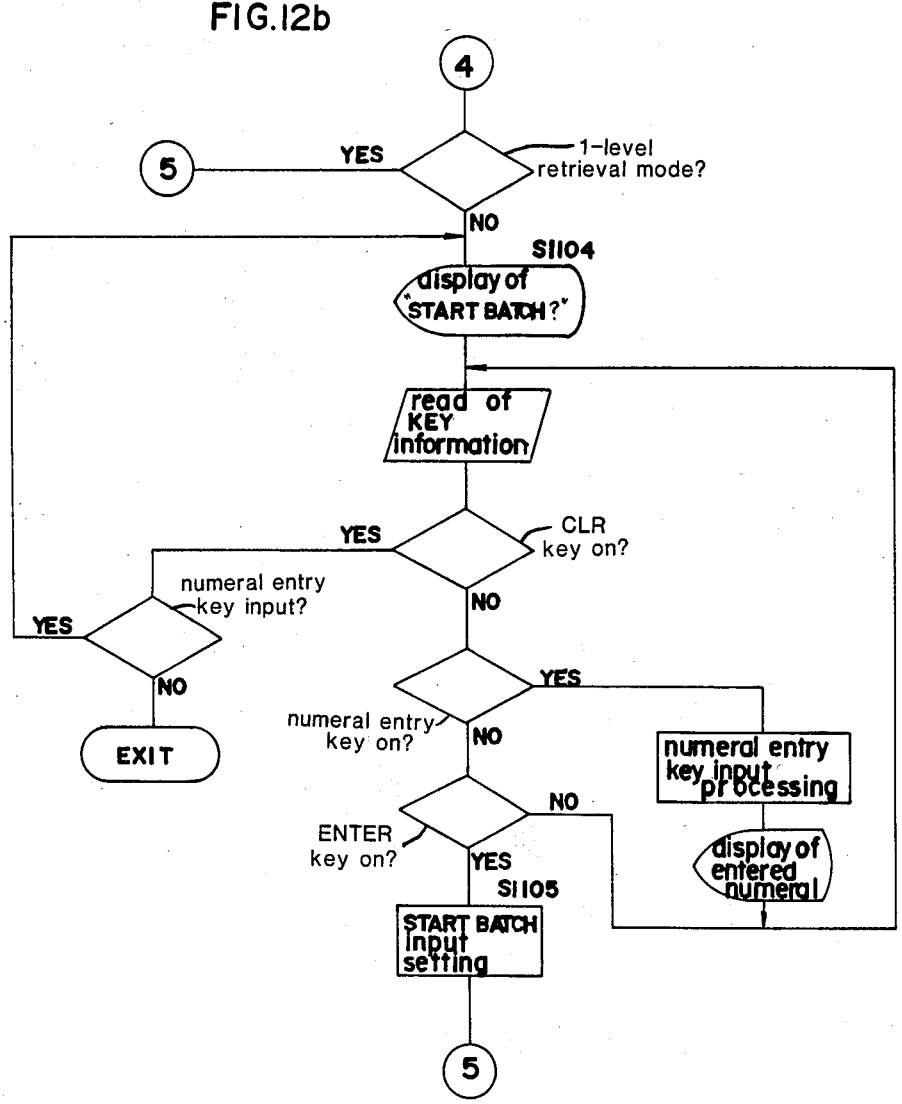

FIG. 12(b) shows the flowchart of 3-level retrieval mode and 20-level retrieval mode. "START BATCH?" is displayed in the start (S1104). A value of the start batch is input in the step (S1105).

Figure 12C:
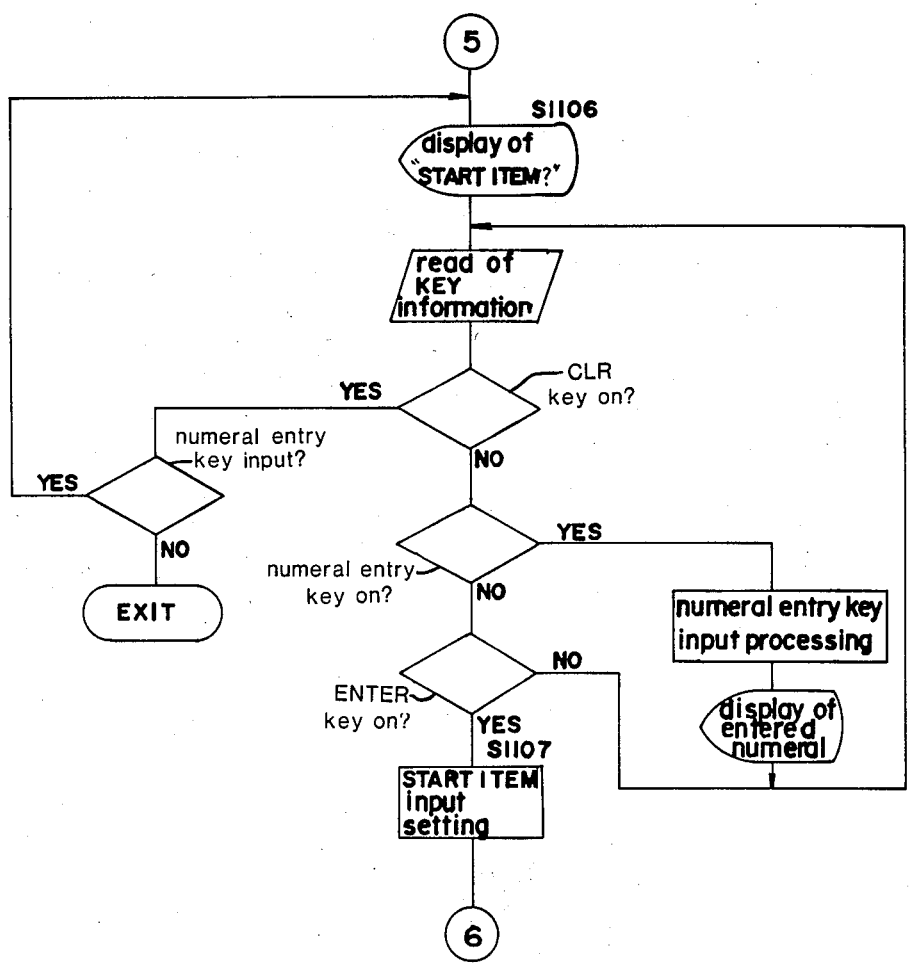

FIG. 12(c) is the flowchart of 3-level retrieval mode, 2-level retrieval mode and 1-level retrieval mode. "START ITEM?" is displayed in the step (S1106). A value of the start item is input in the step (S1107).

Figure 12D:
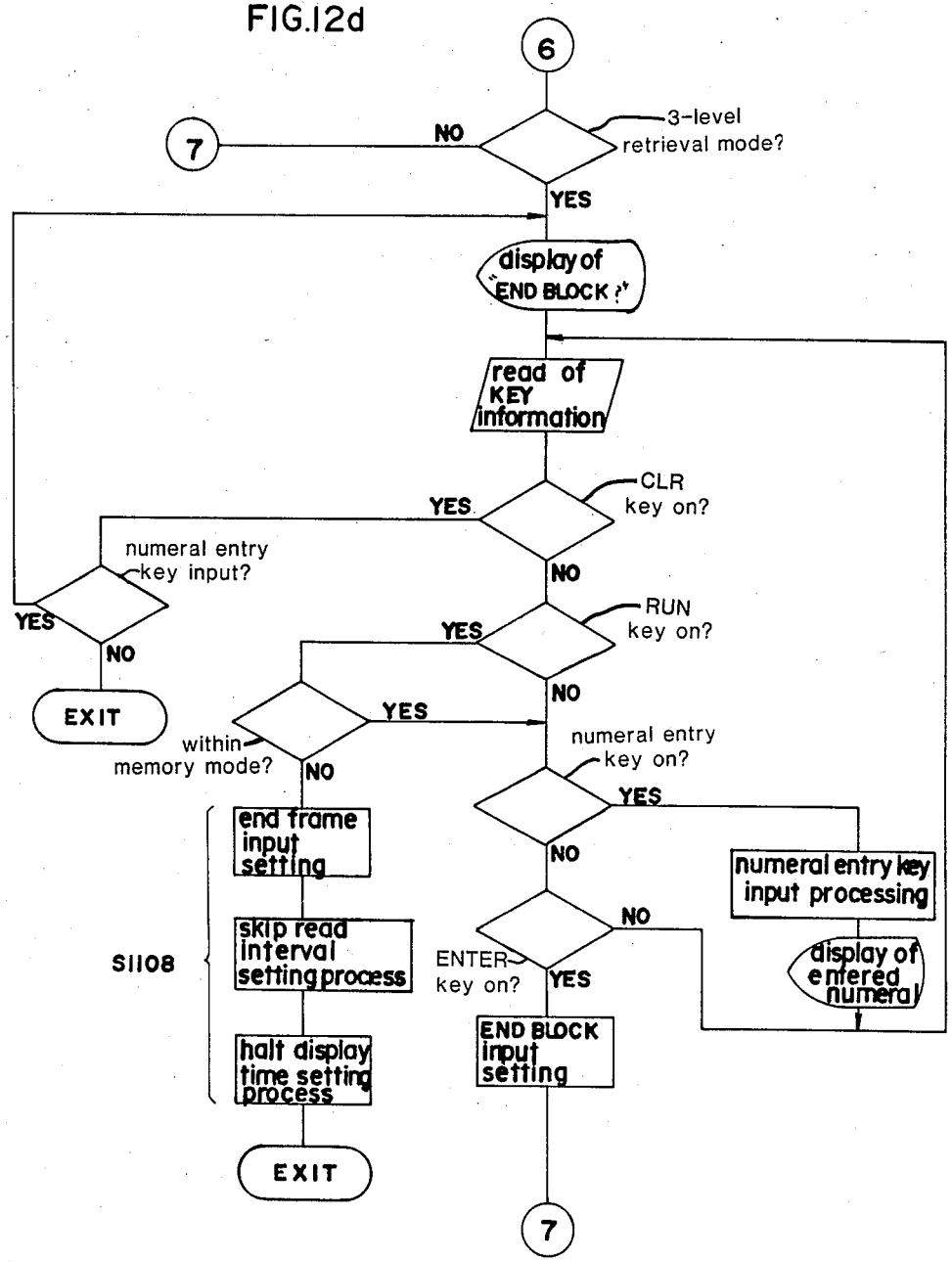
Figure 12E:
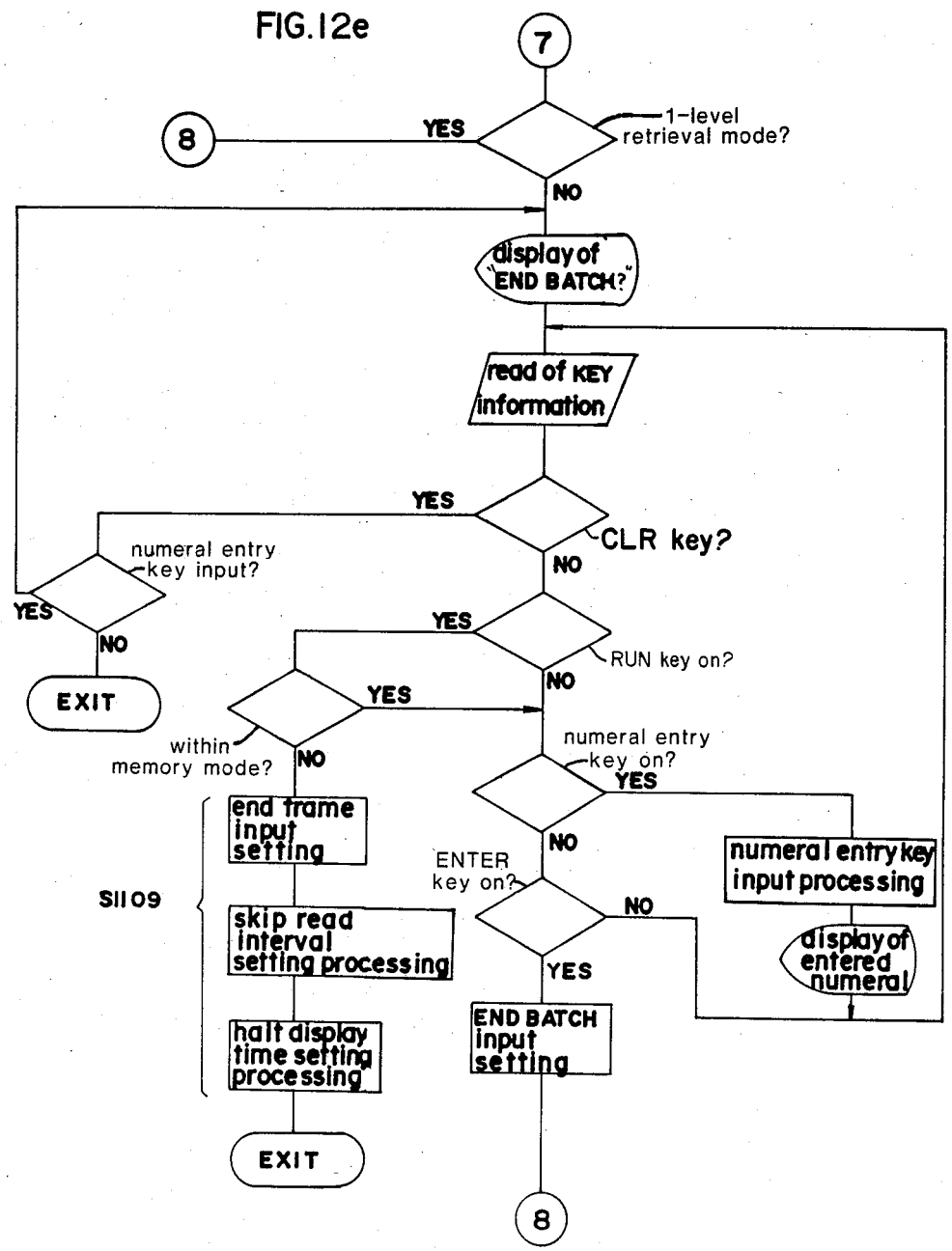
Figure 12F:
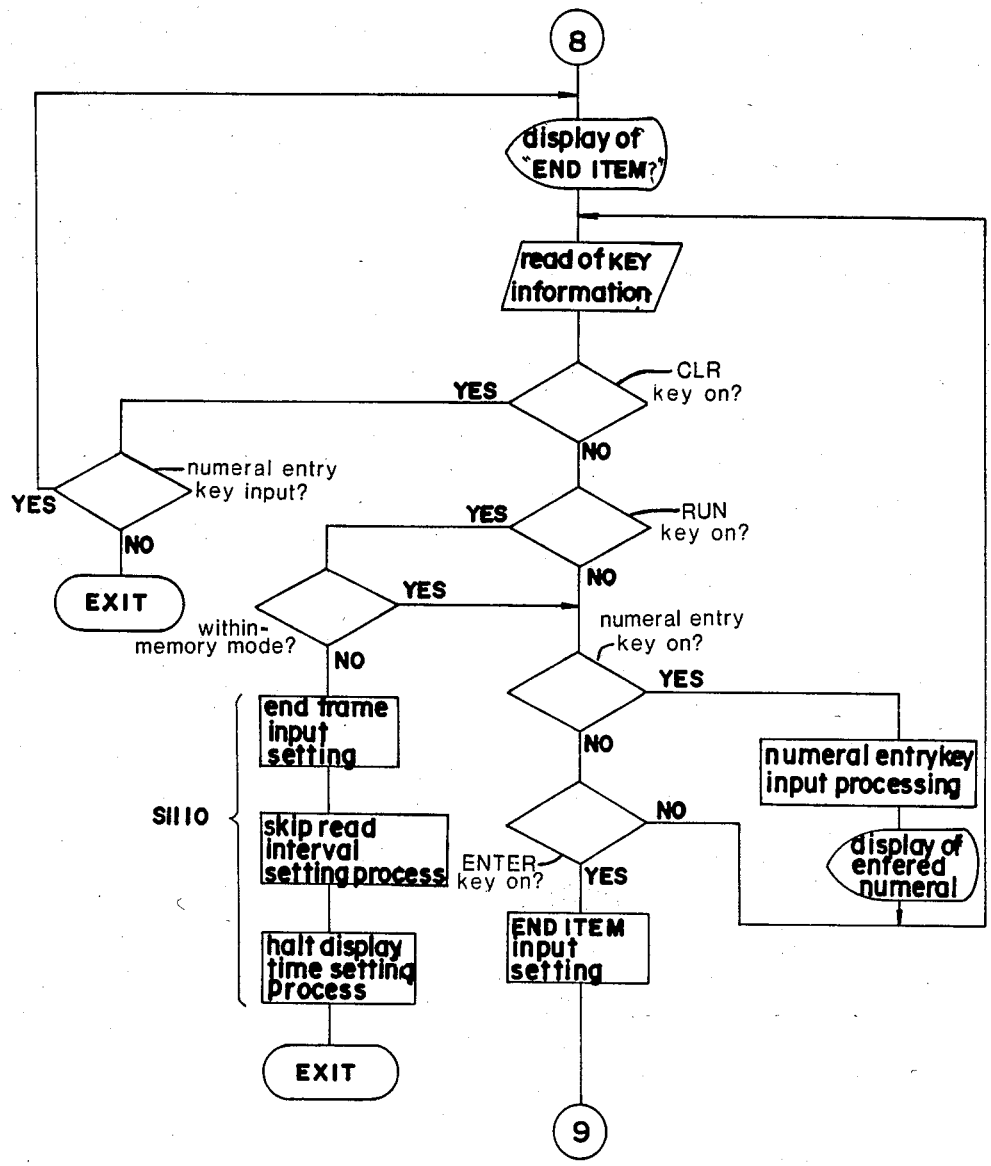

In the same way, FIGS. 12(d)-(f) respectively show the input processings of the end block, the end batch and the end item in the retrieval modes of respective levels. The automatic setting value when the RUN key is set to ON is set in the step group (S1108),(S1109) and (S1110).

Figure 12G:
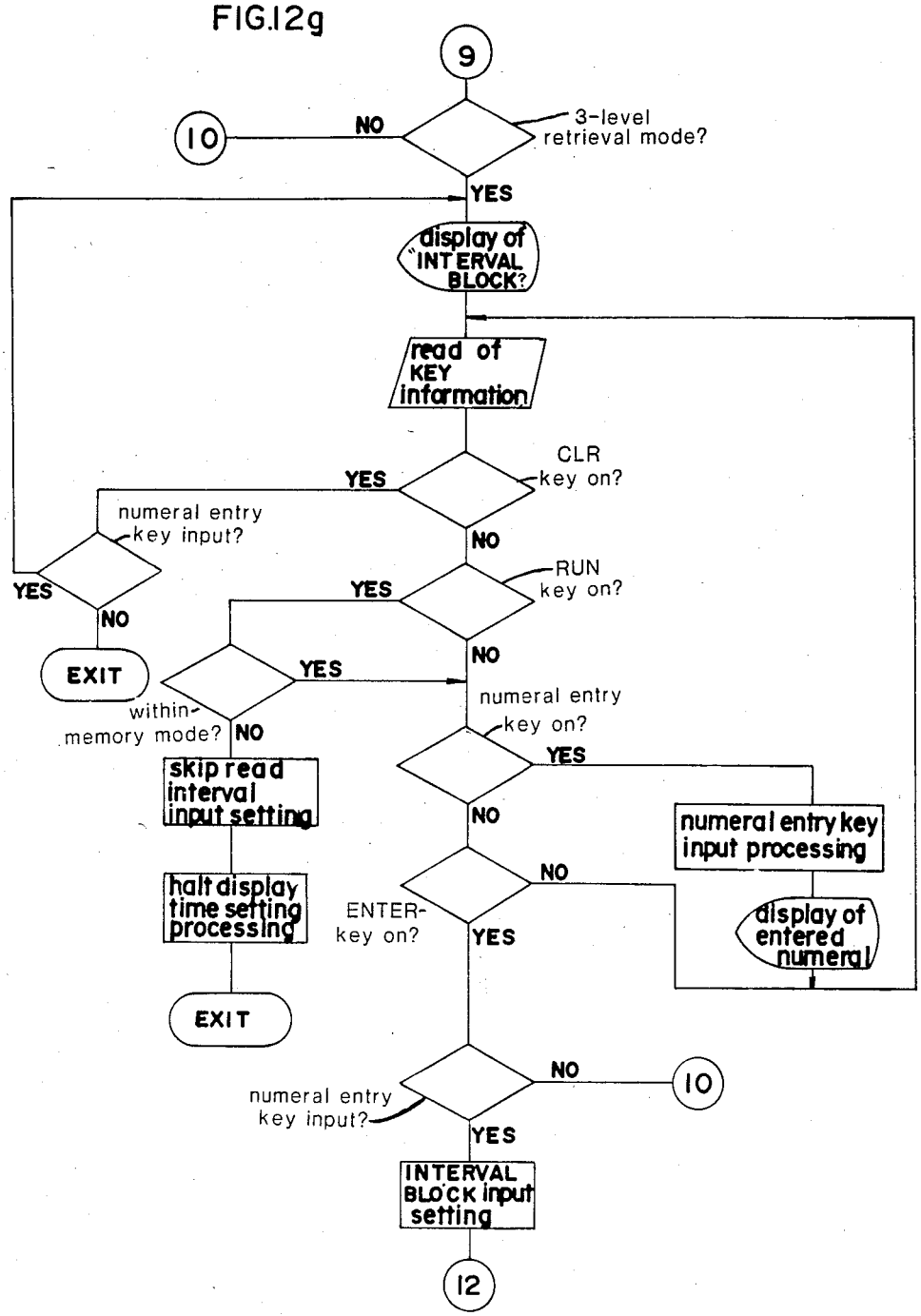
Figure 12H:
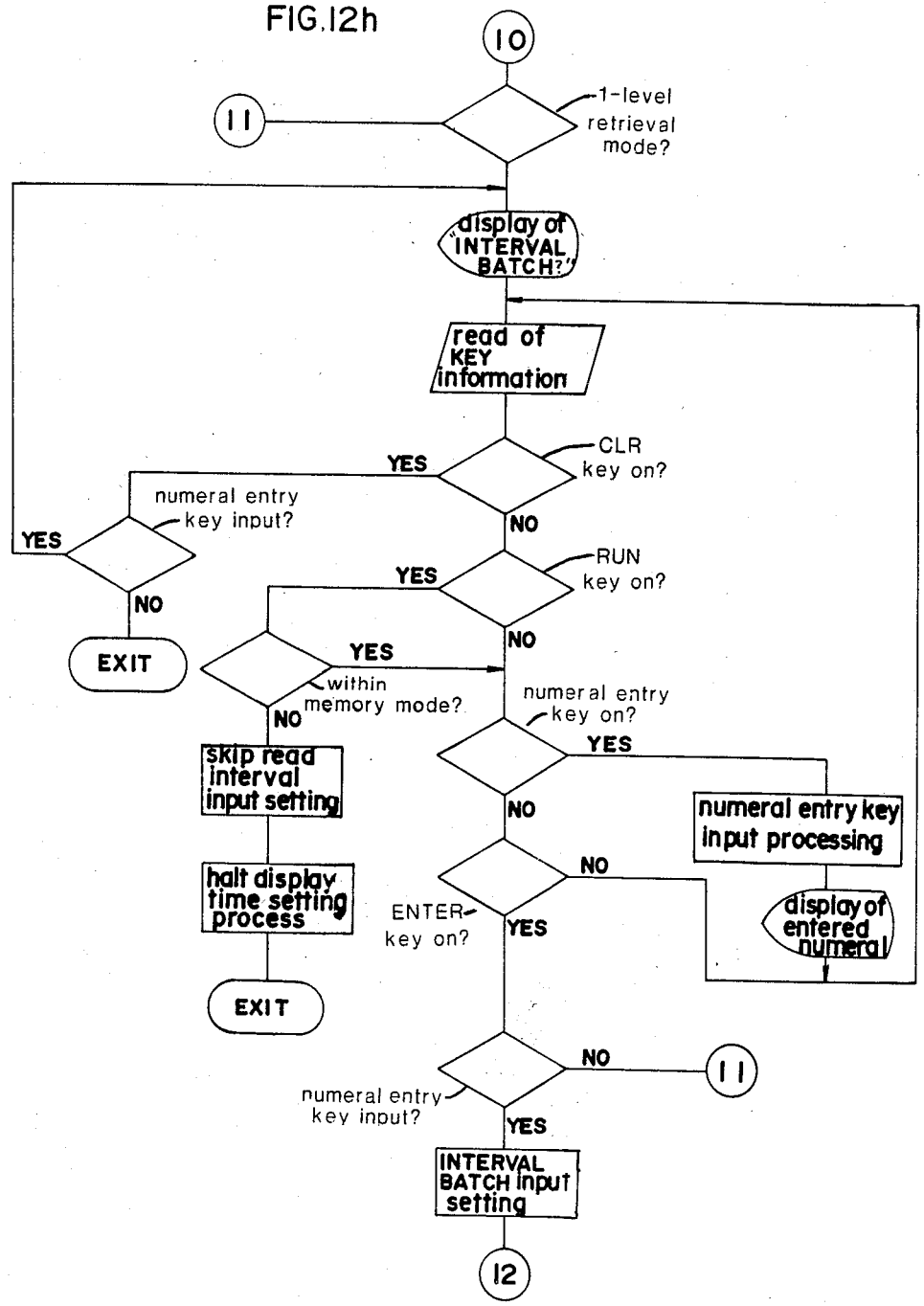
Figure 12I:
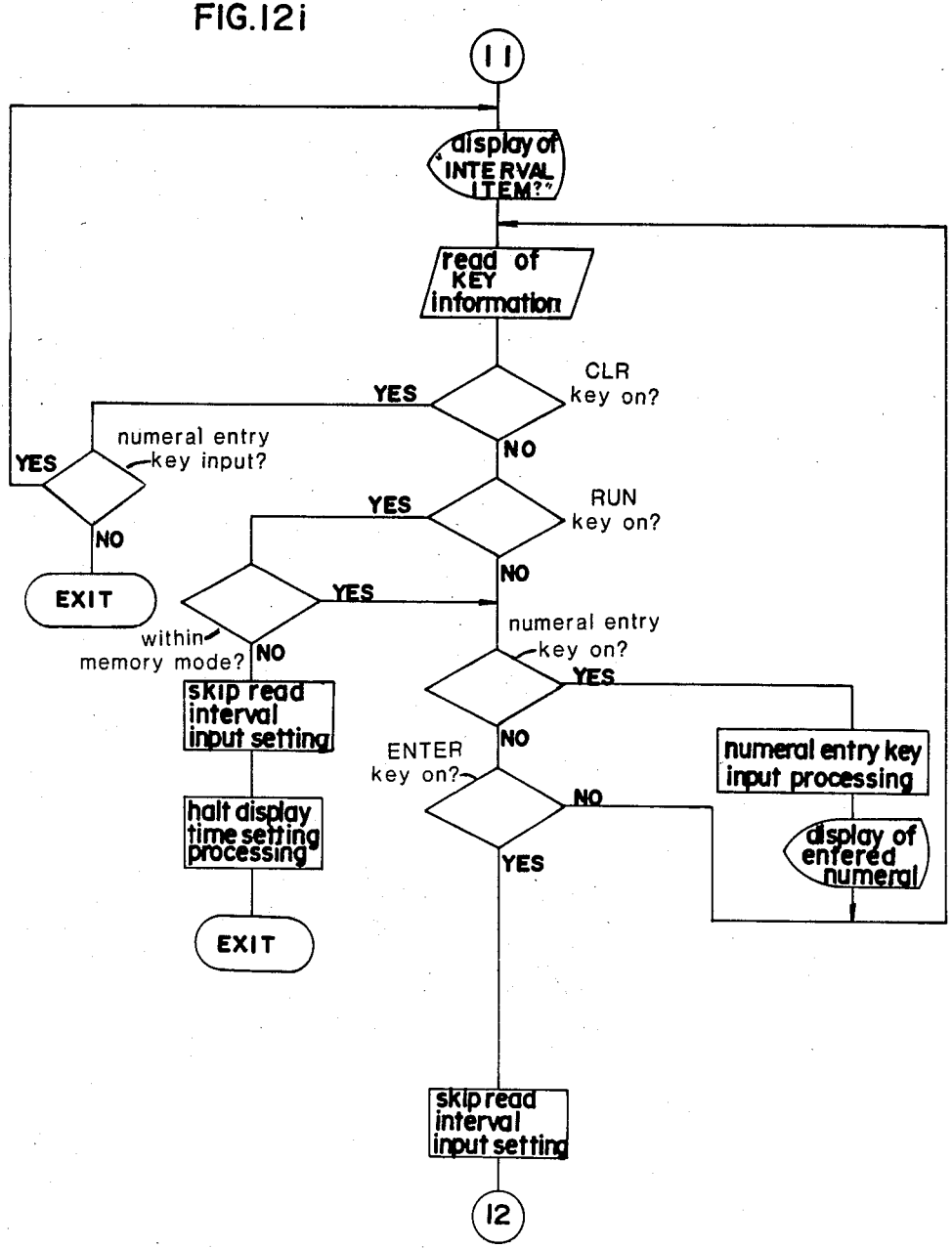

FIGS. 12(g)~(i) show the sequence for inputting the skip read intervals of the block, batch and item in the retrieval mode of respective levels. Such setting is possible for any one of the block, batch and item.

Figure 12J:
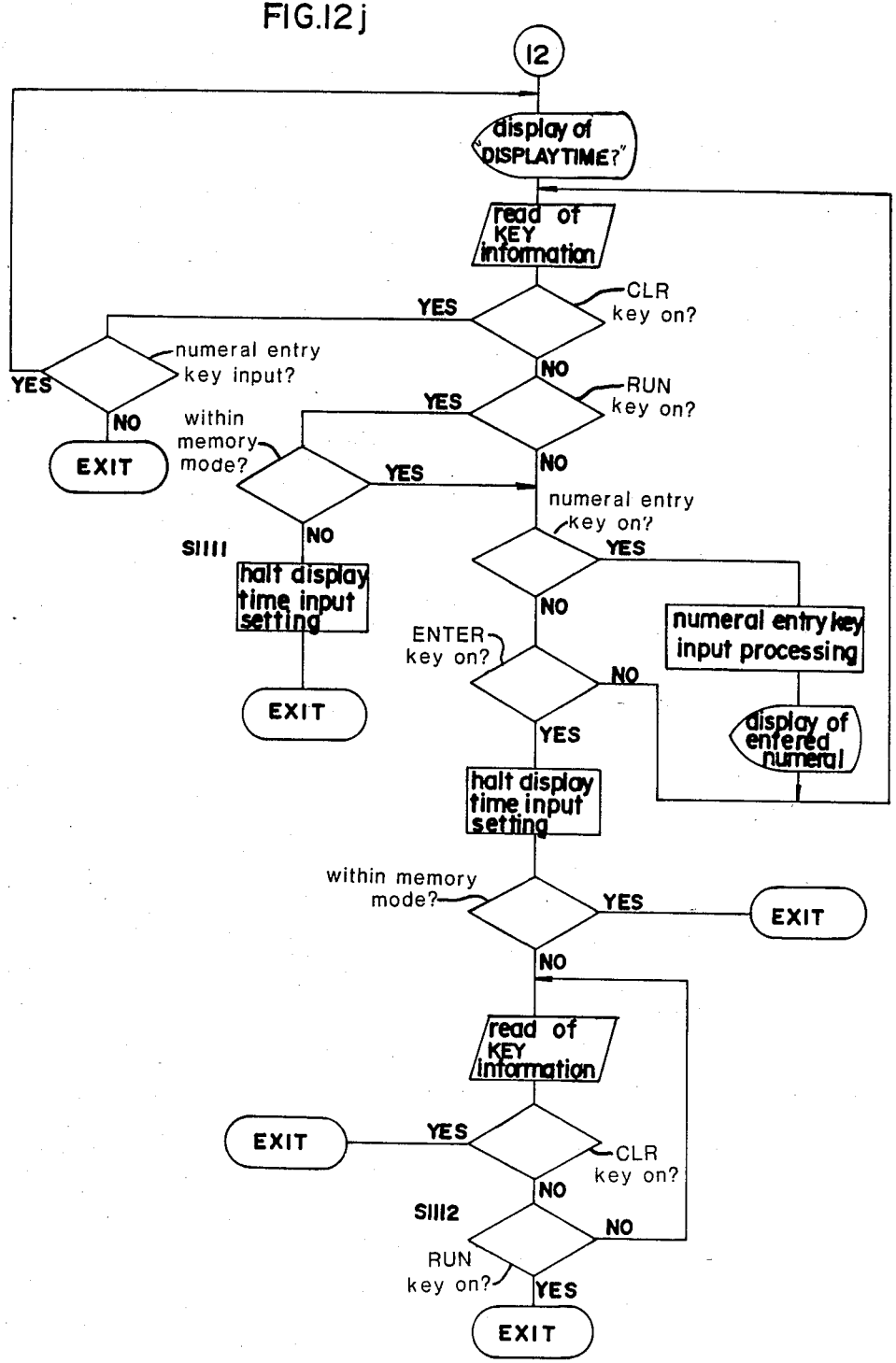

FIG. 12(j) shows the sequence for setting input of the display time by halting the frame. When the input is omitted by setting the RUN key to ON, a previous setting value is automatically set in the step (S1111). When the RUN key is set to ON in the step (S1112), operation flow is shifted to the Browse operation execution subroutine (#12).

(5) Print input subroutine:

FIG. 13 shows a flowchart indicating details of the Print input subroutine.

Figure 13A:
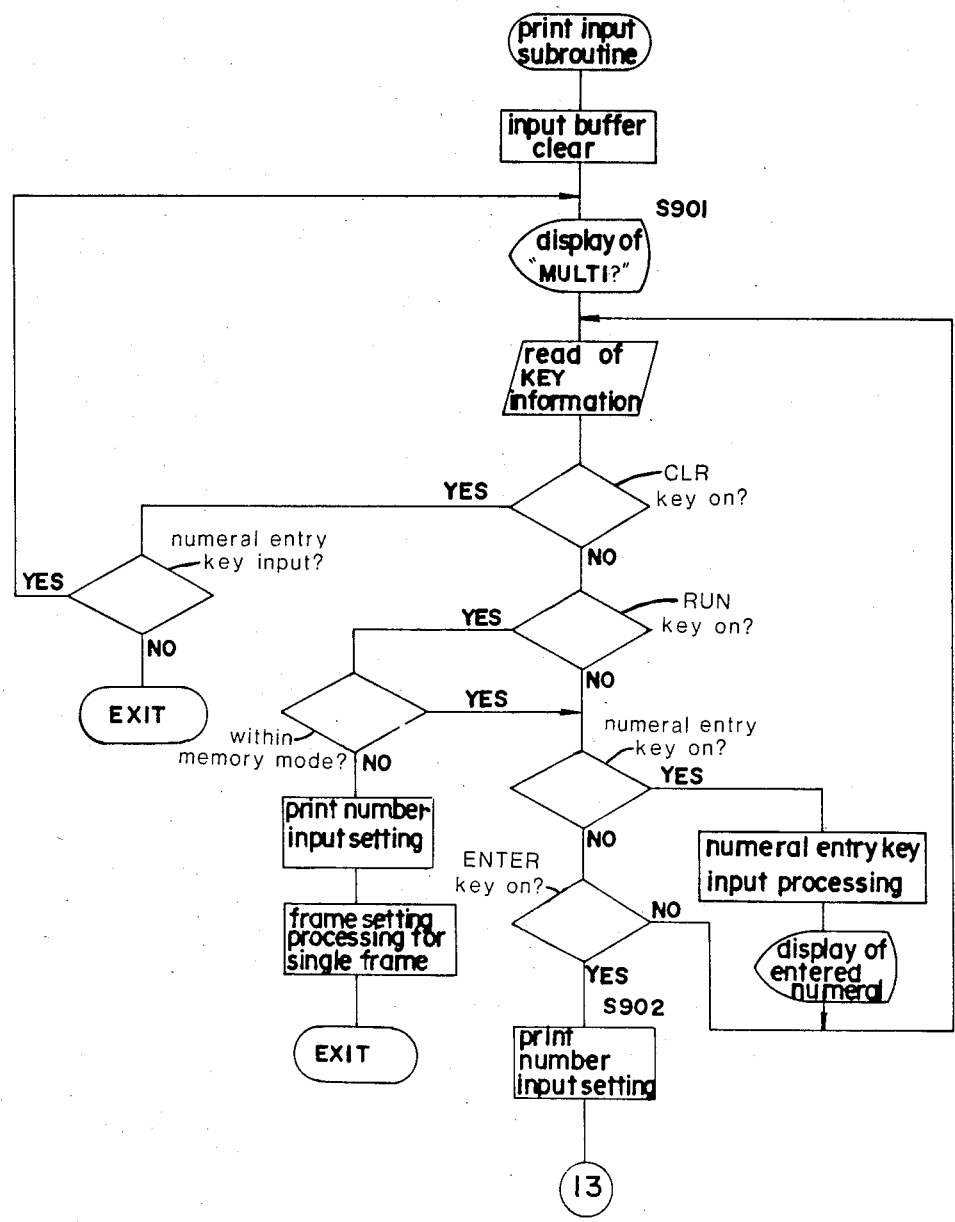

In FIG. 13(a), "MULTI?" is displayed first in order to set a number of copies in the step (S901). A number of sheets of print is input in the step (S902) by the numeral entry key or by the automatic setting.

Figure 13B:
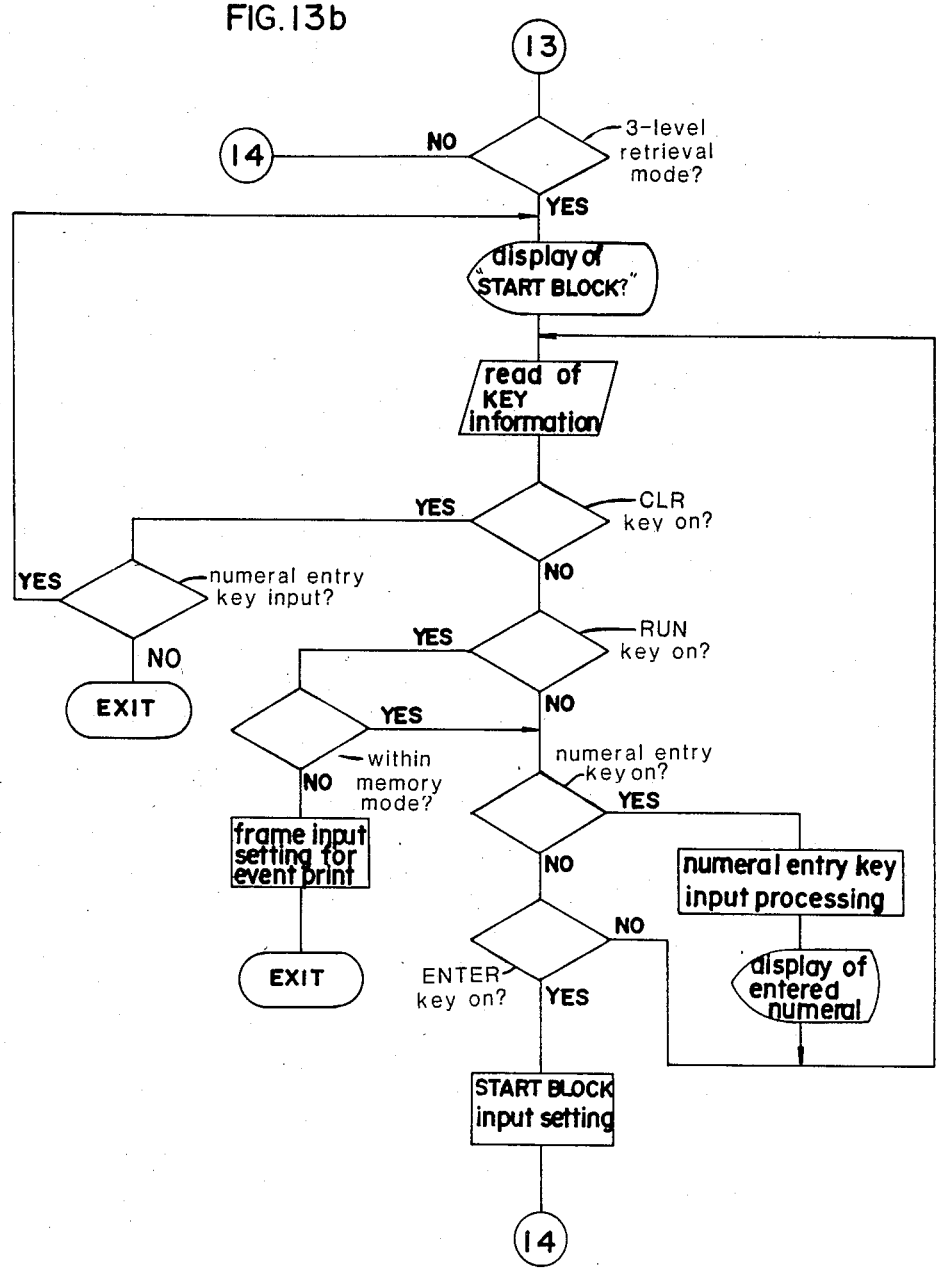
Figure 13D:
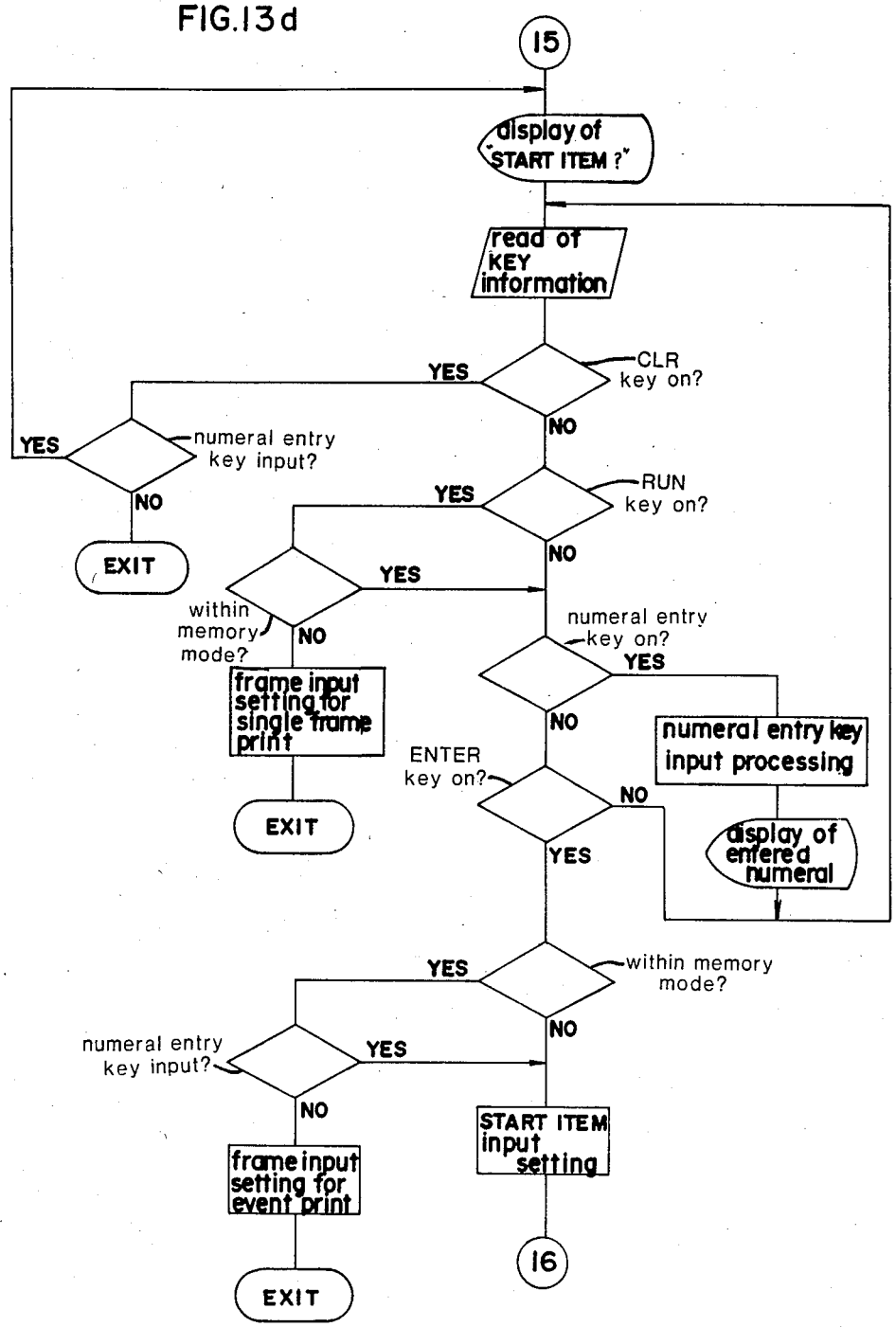

FIGS. 13(b)~(d) show the flows for setting input of the start block, start batch and start item in accordance with retrieval mode of each level. In any case, input setting is possible with the aid of the display which urges input manipulation.

Figure 13E:
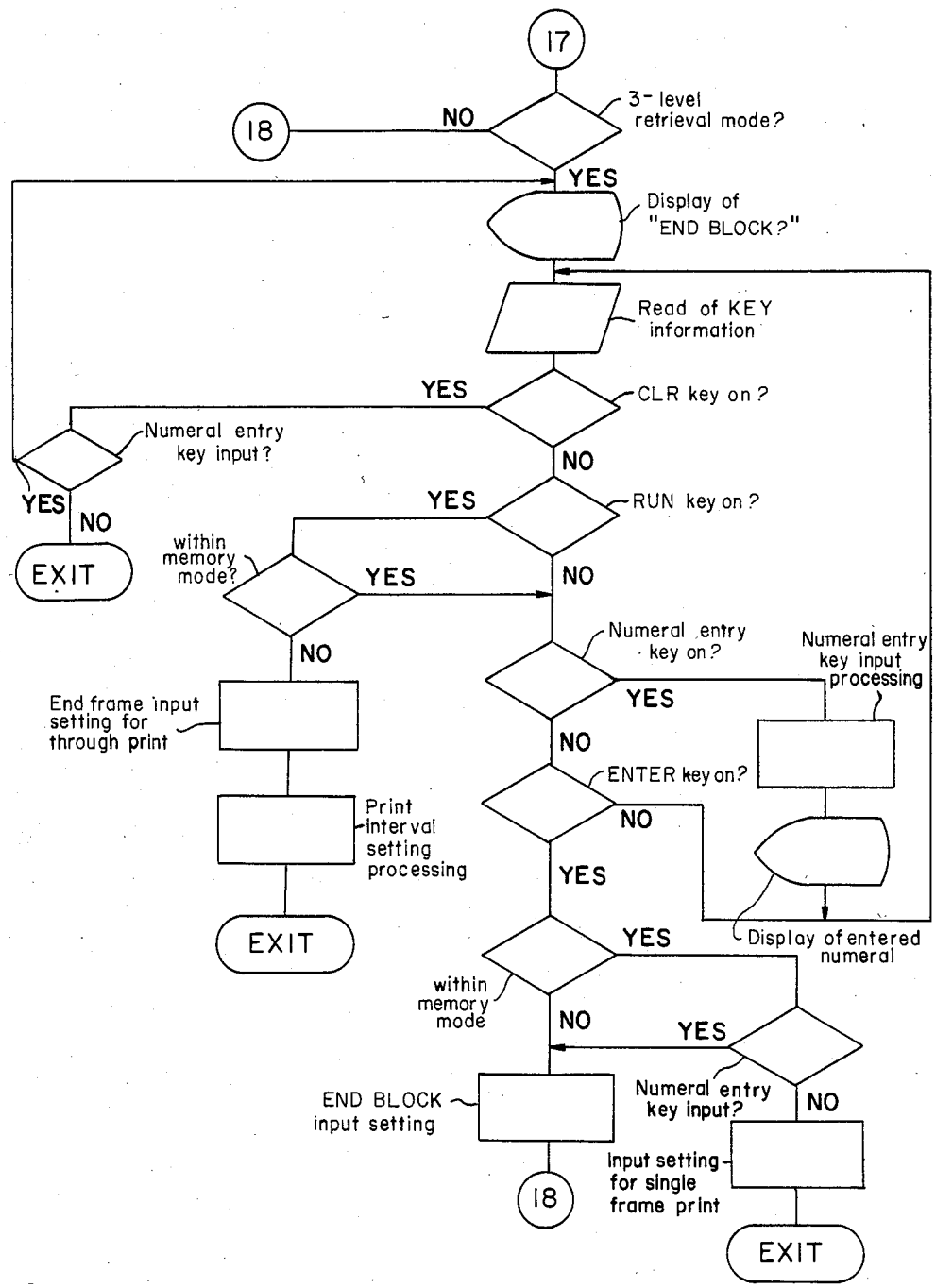
Figure 13F:
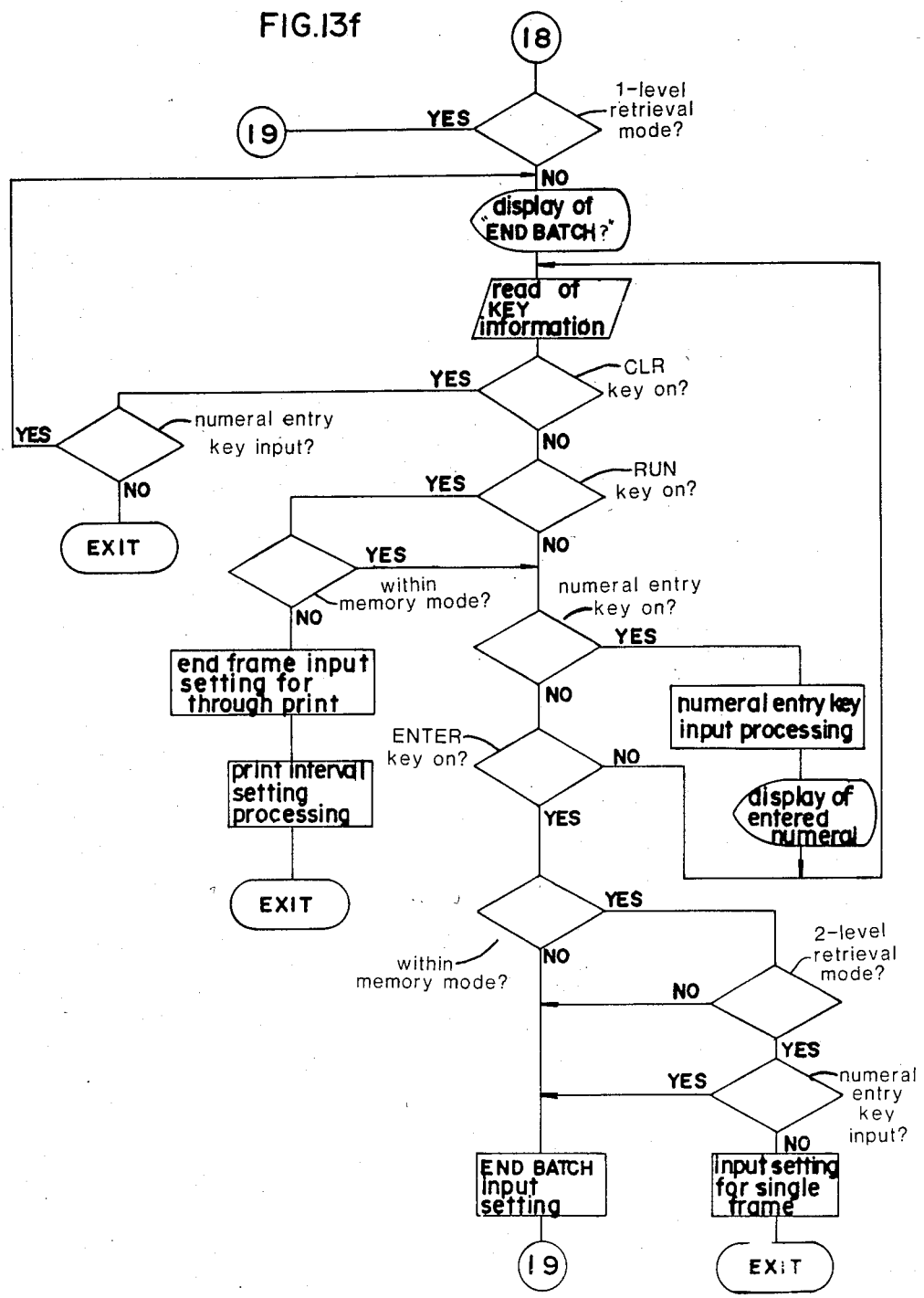
Figure 13G:
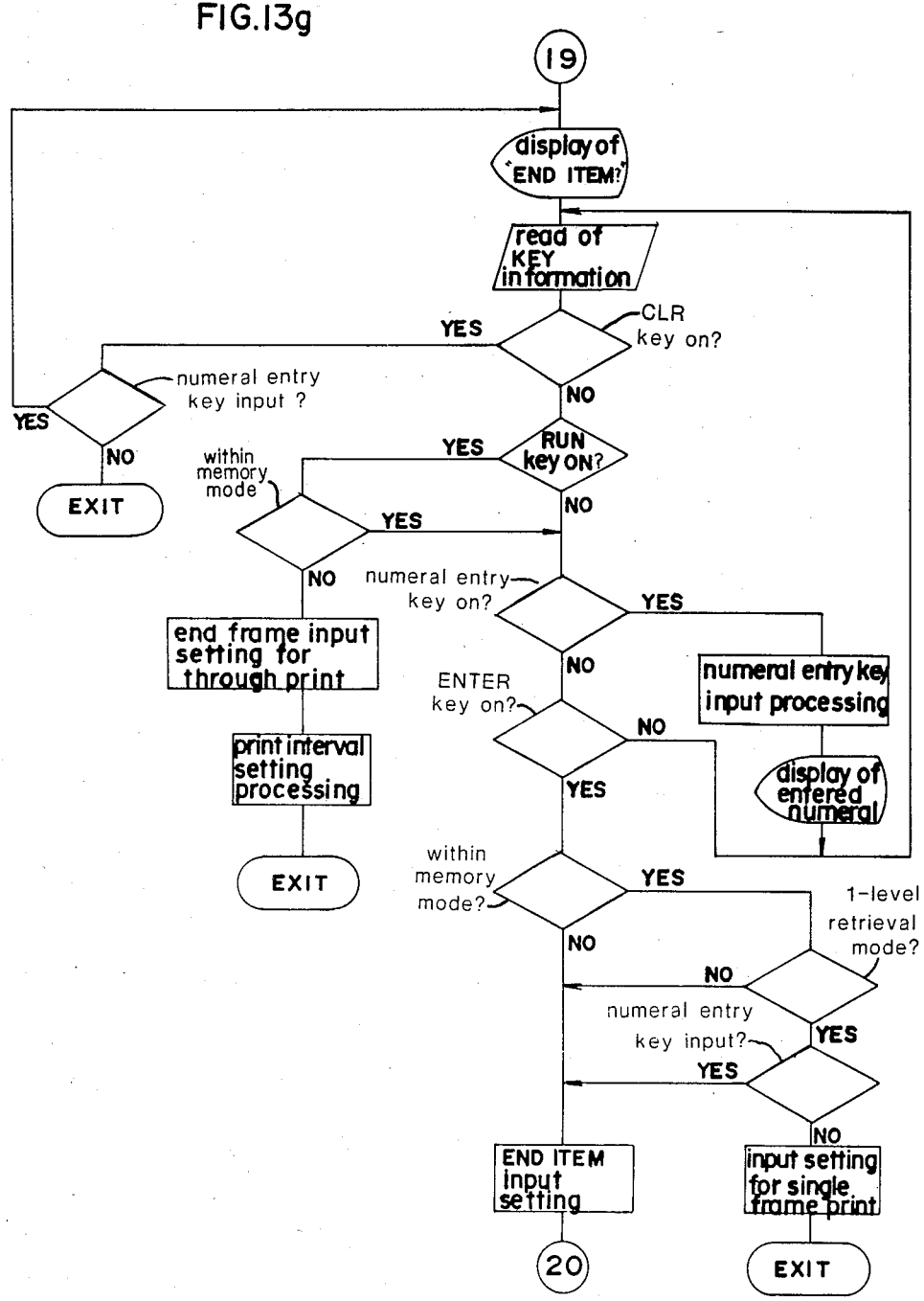

FIGS. 13(e)~(g) show the operation flows for setting input of the end block, end batch and end item. In this case, setting is also possible following the display.

Figure 13H:
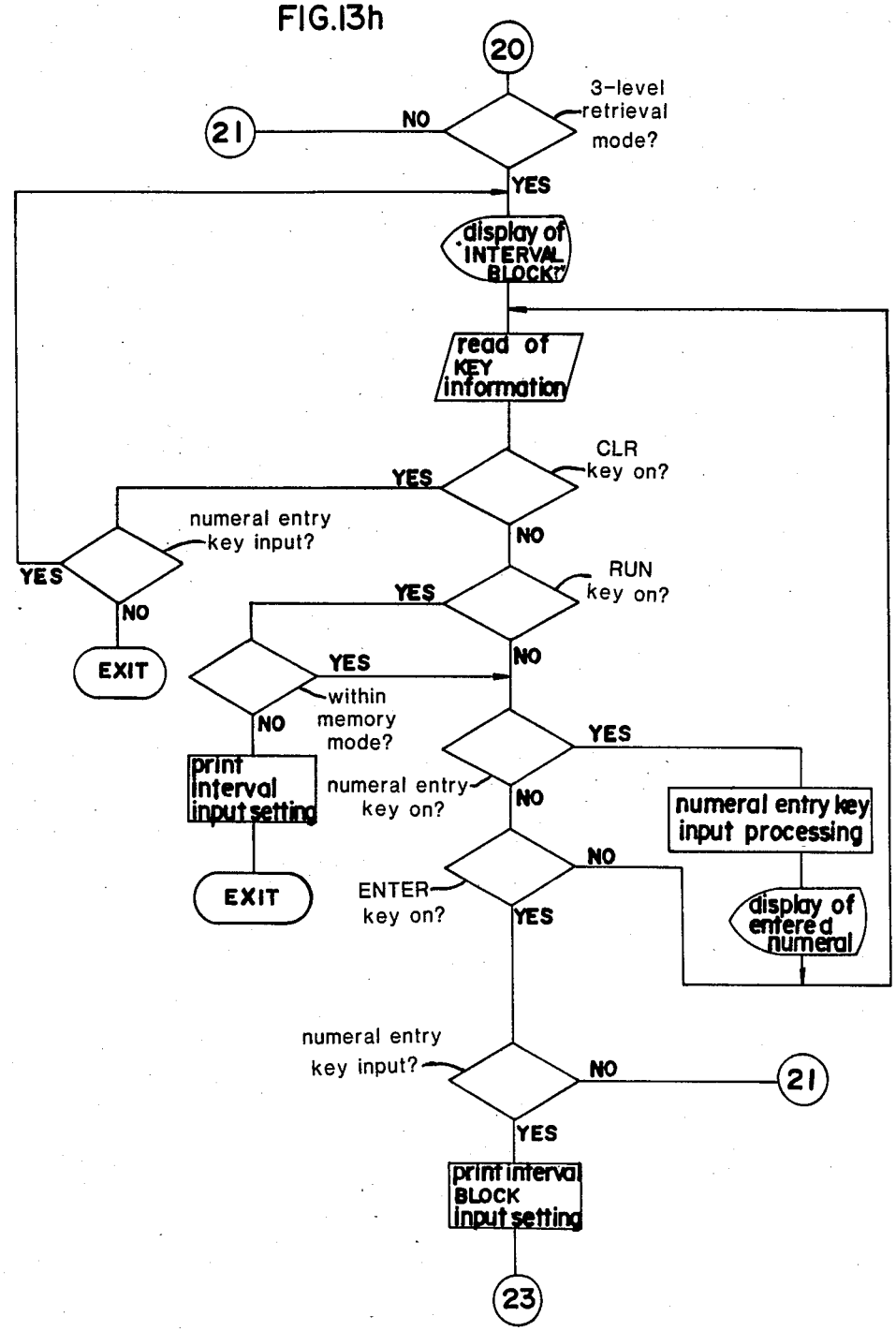
Figure 13I:
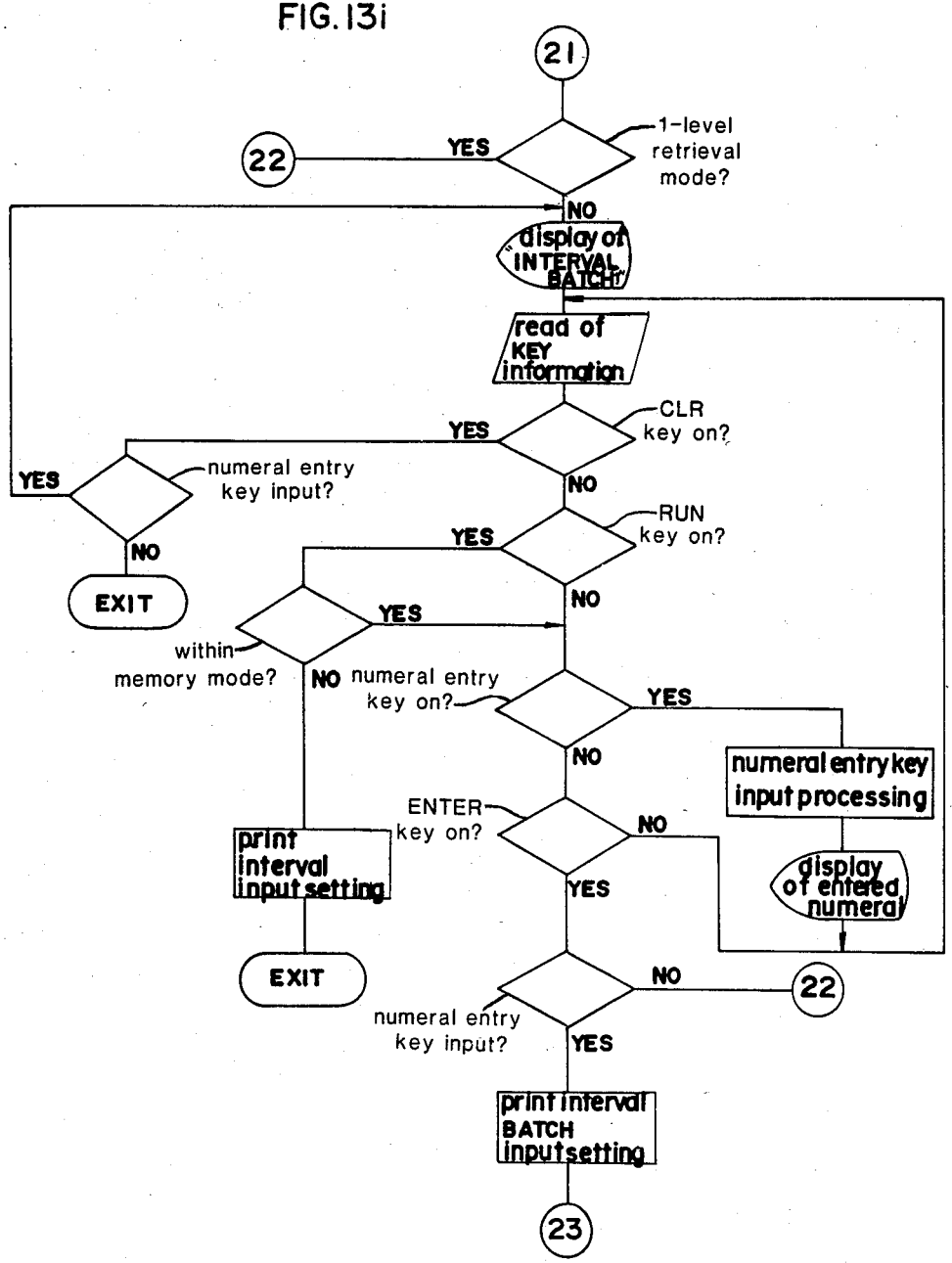
Figure 13J:
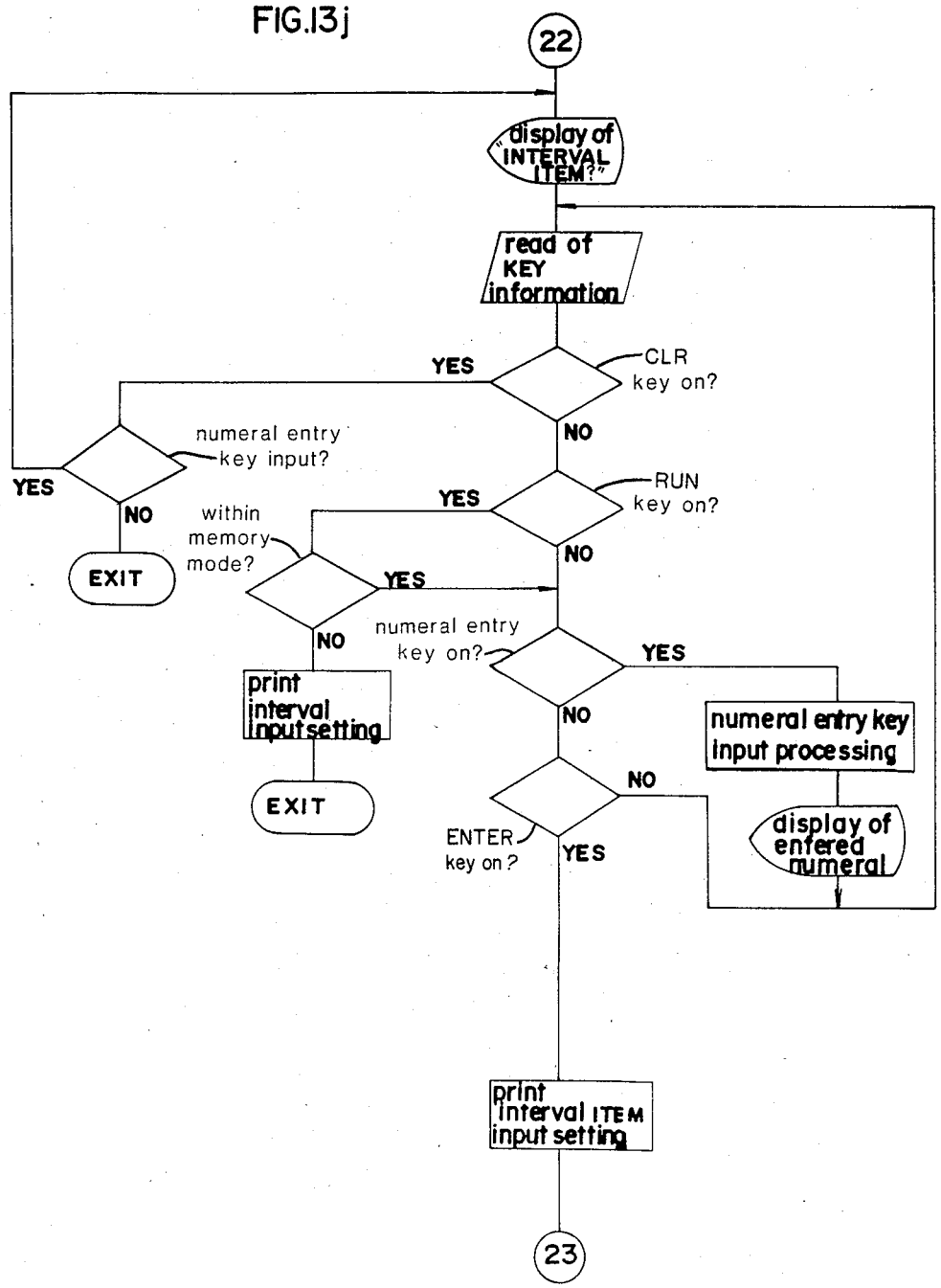

FIGS. 13(h)~(j) show the sequences for setting input of the print interval in accordance with the block, batch and item. In this case, setting is possible for any one of the block, batch and item.

Figure 13K:
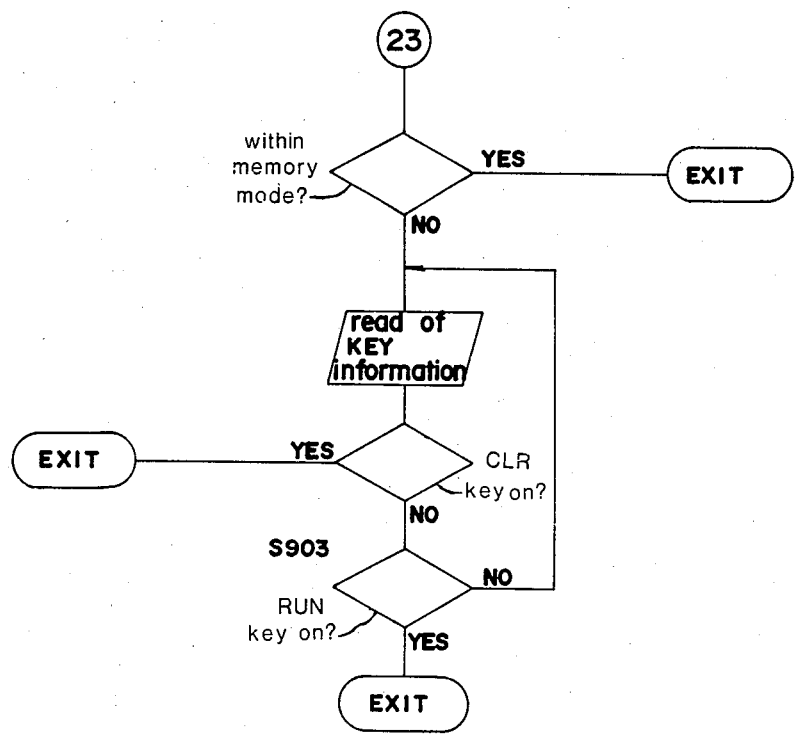

In FIG. 13(k), when the RUN key is discriminated to be set to ON in the step (S903), operation flow is shifted to the Print operation execution subroutine (#10).

(6) SET input subroutine:

FIG. 14 is a flow chart indicating details of the SET input subroutine.

In the step (S1300), a film is first judged to be loaded or not. When the film is not loaded, a relevant input buffer is cleared in the step (S1301). The retrieval mode is discriminated in the step group (S1302) and "START . . . " is displayed in accordance with the retrieval level. When manipulation of the numeral entry key is detected in the step (S1303) and the ENTER key is discriminated to be set to ON in the step (S1304), the heading frame address of the film is input to said buffer in the step (S1305).

Figure 14A:
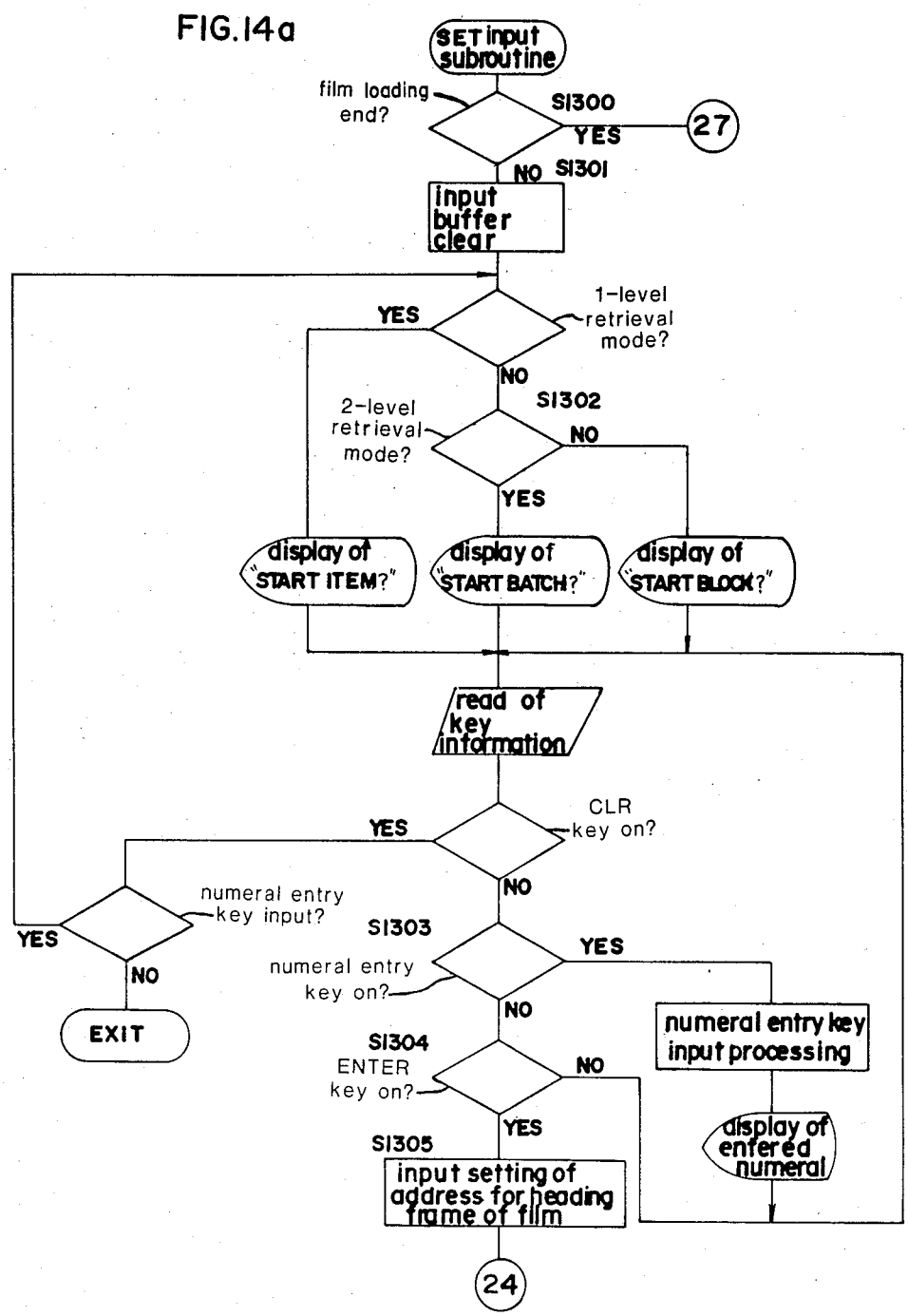
Figure 14B:
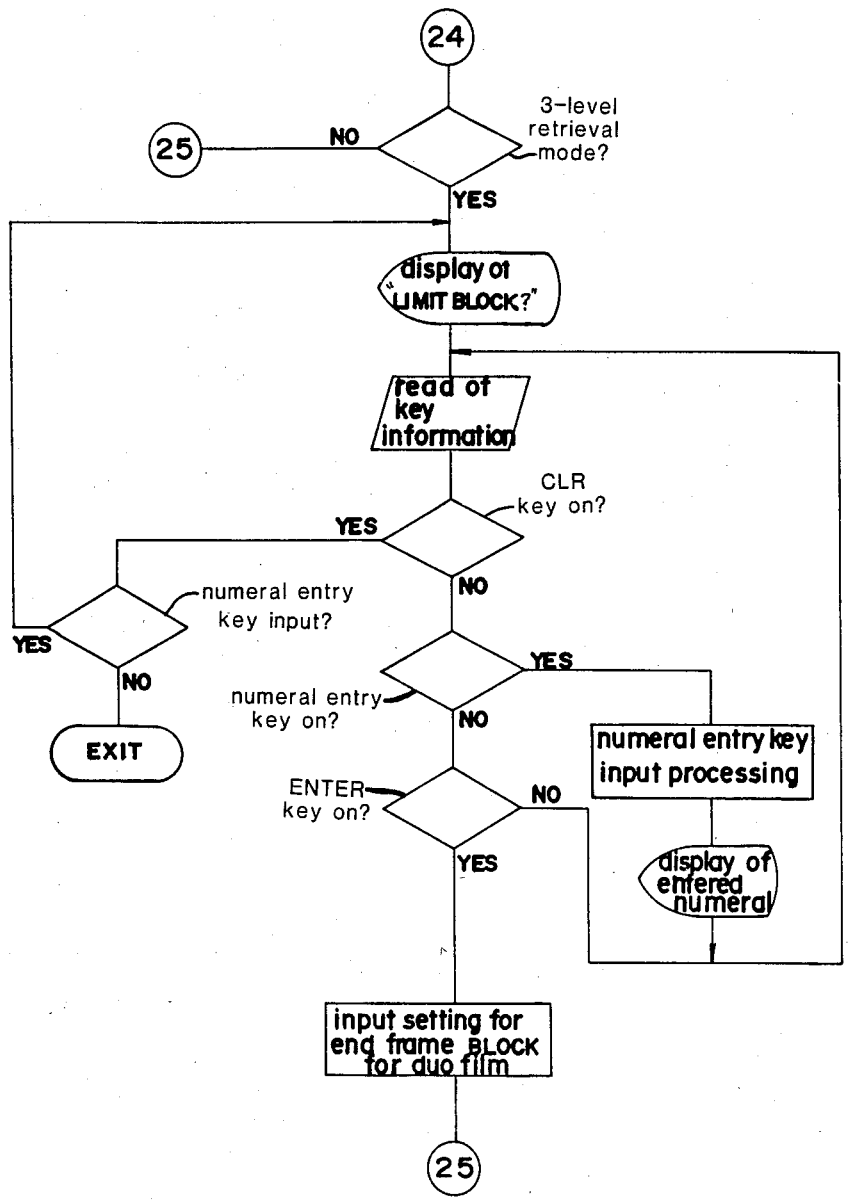
Figure 14C:
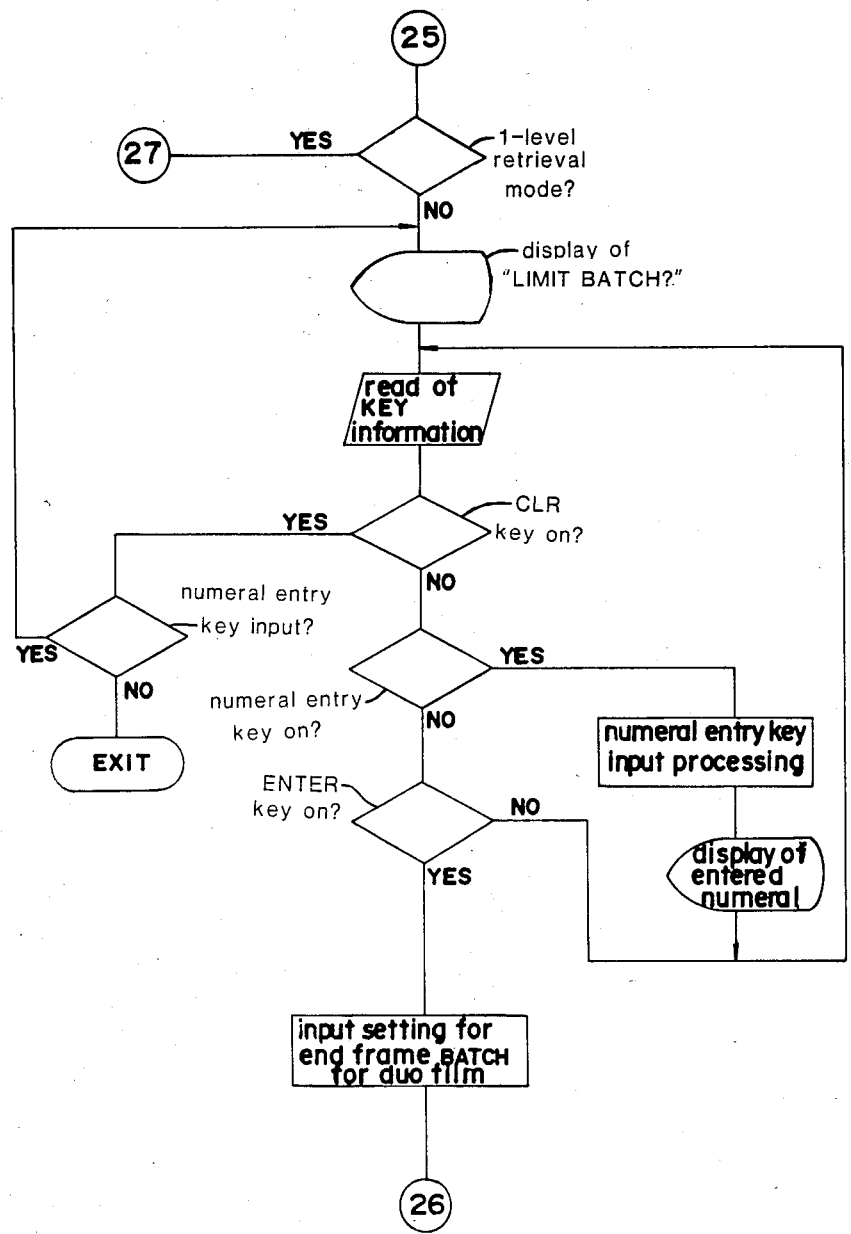
Figure 14D:
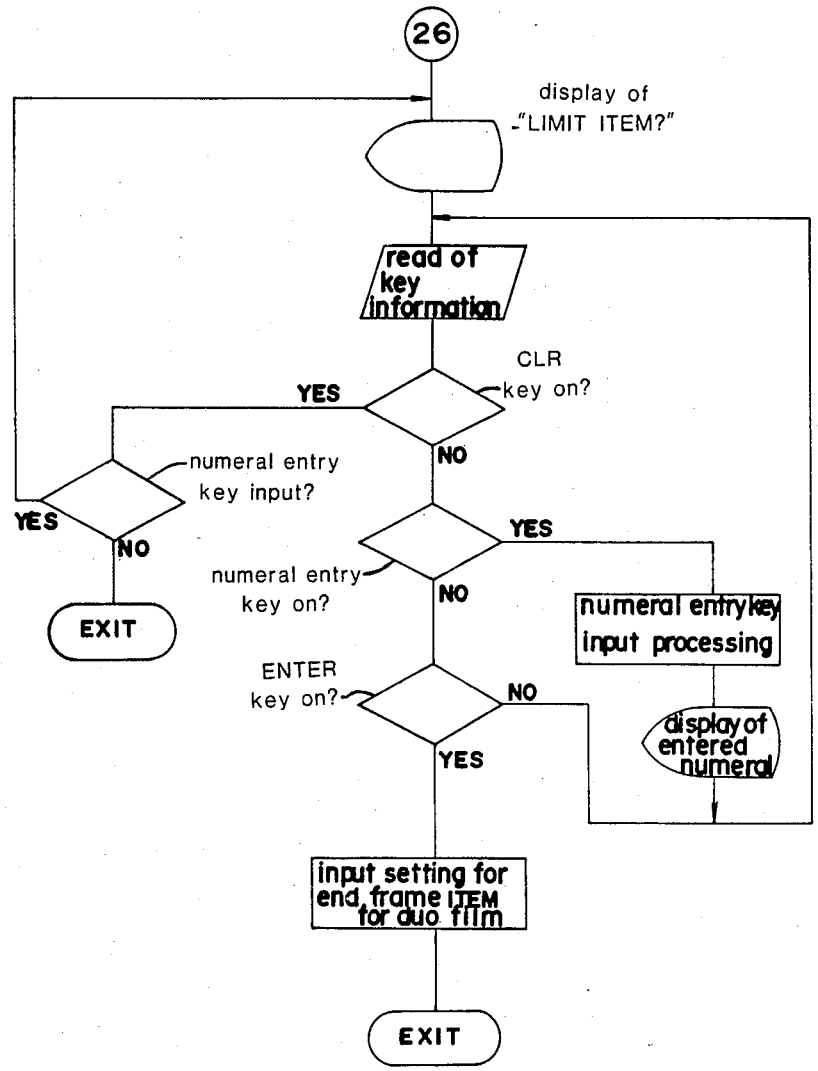

FIGS. 14(b)~(d) show the sequences for setting input of the address of the final frame respectively to block, batch and item. In each sequence, "LIMIT...?" is displayed after discrimination of the retrieval mode, urging input manipulations. The respective final frame addresses are set by the manipulations of numeral entry keys or automatic setting.

Figure 14E:
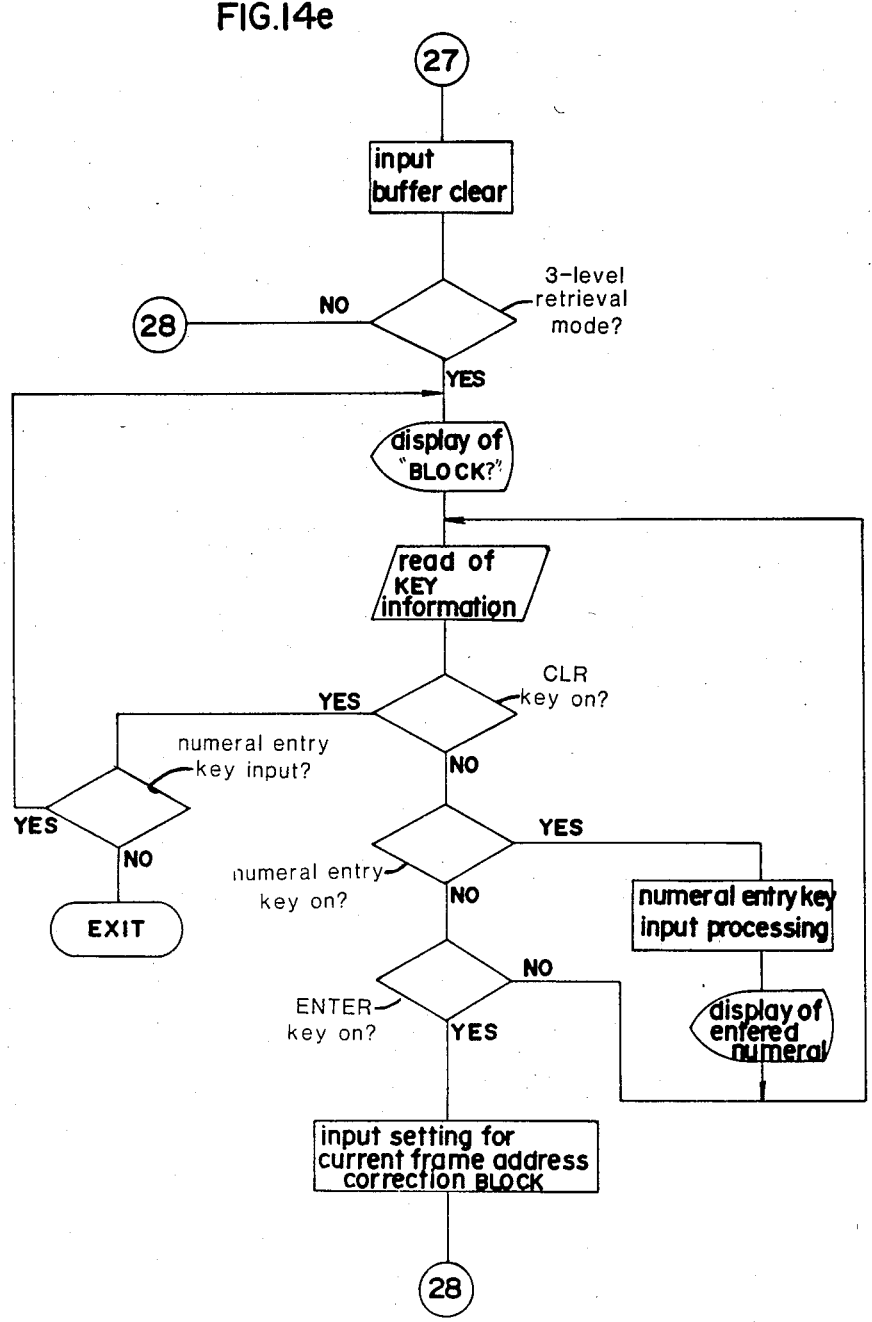
Figure 14F:
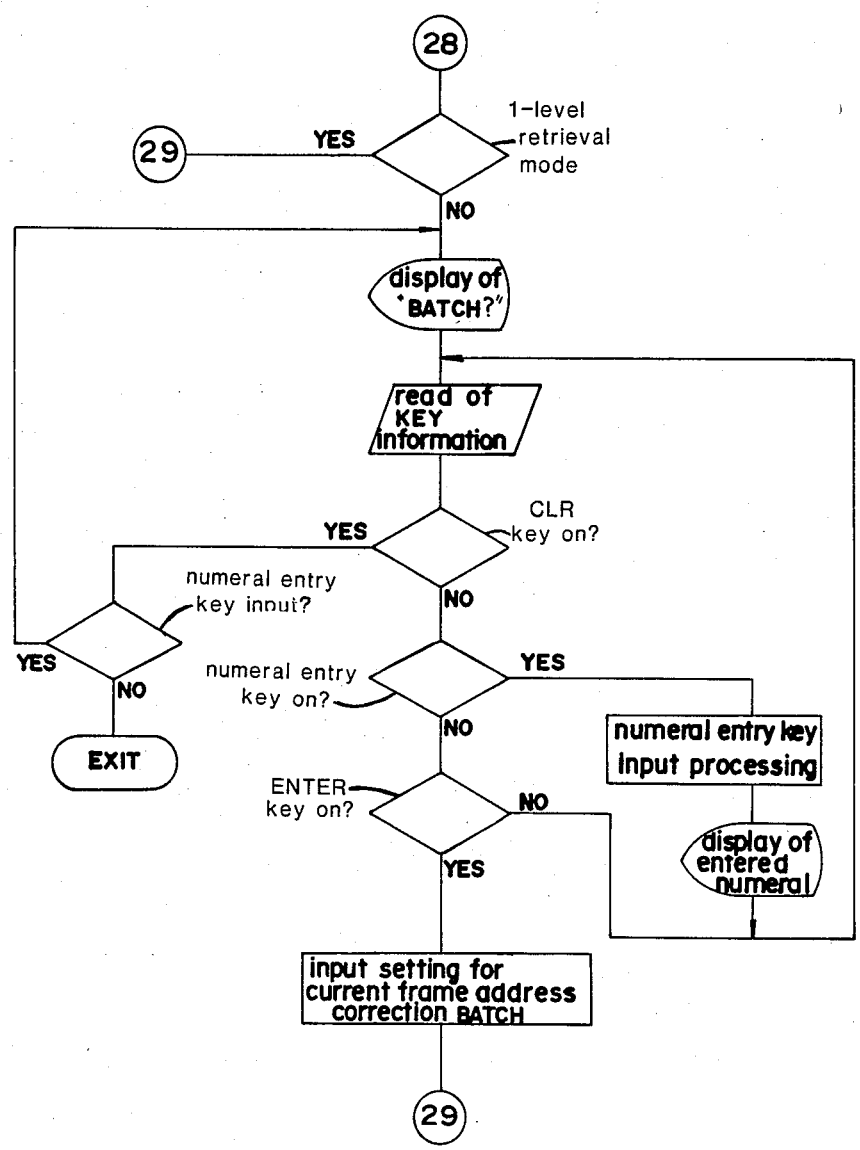
Figure 14G:
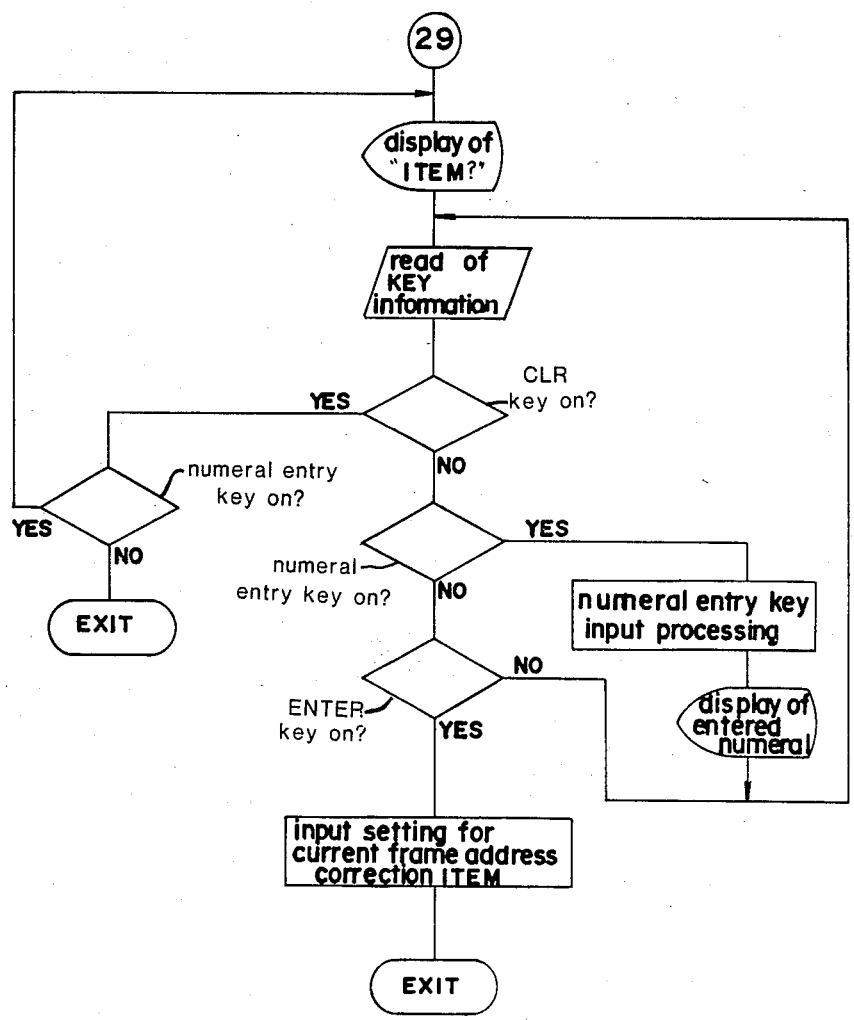

FIGS. 14(e)~(g) show the sequences for setting input of current frame addresses respectively for each block, batch and item. The corrected frame addresses are set to the respective input buffers.

(7) Search operation execution subroutine:

FIG. 15 shows a flow chart indicating details of the Search operation execution subroutine (#8).

In the step (S800), data of the retrieval object frame being set to the input buffer is loaded first to this program. Next, this data is compared with the address data of the current frame in the step (S801). If these data do not match, arithmetic operation for determining film feed direction is carried out in the step (S802). Results of the operation is discriminated in the step (S803) and the film forward and backward drive signals are output in the steps (S804),(S805). In the step (S806), large, intermediate and small blip marks of film passing are counted respectively. It is judged in the step (S807) whether the frame currently projected is the frame of retrieval object or not. If it is different, operation returns to the step (S802), driving a film so that the difference becomes small. If the current frame corresponds to the object frame in the step (S807), the frame of film is fixed by outputting the film drive halt signal in the step (S808).

Figure 16:
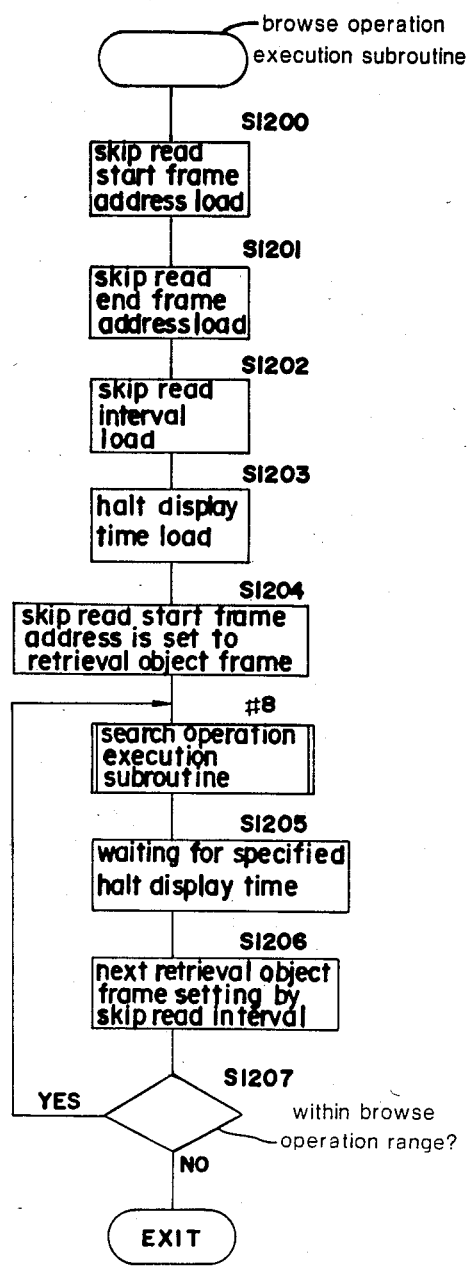
FIG. 16 is a flowchart indicating detail of Browse operatin execution subroutine, FIGS. 17 (a-d) show the flowcharts indicating detail of Print operation execution subroutine, FIGS. 18 (a-g) show schematically the keying manipulation and desplay contents for each operation mode, and FIGS. 19 (a,b), 20(a,b), 21, 22, 23(a,b), 24(a,b), 25 and 26 show details for explaining the retrieval mode.

(8) Browse operation execution subroutine:

FIG. 16 is a flow chart indicating details of Browse operation execution subroutine.

First, a skip read start frame address, end frame address, skip read interval and halt display time data being set to the input buffer are respectively loaded to this program in the steps (S1200) - (S1203). Next, in the step (S1204), the start frame address is set to the retrieval object frame and the Search operation execution subroutine of (#8) is executed. When the object frame is retrieved, it is halted in the step (S105) during the halt display time loaded in the step (S120). In the step (S1206), the next retrieval object frame is determined by the skip read interval data loaded in the step (S1202). When the result is judged to be within the range of the Browse operation in the step (S1207), operation returns to the step (#8) and the search operation is started again. When the result is judged to be out of the range of the Browse operation in the step (S1207), the Browse operation is completed.

(9) Print operation execution subroutine:

FIG. 17 is a flow chart indicating details of the Print operation execution subroutine.

The data of a number of sheets to be printed is loaded to this program from the input buffer in the step (S1001). Next, it is discriminated whether print of one frame is to be conducted or not in the step (S1002). In the case of YES, an address of a frame to be printed is loaded in the step (S1003). Thereafter, the Search operation execution subroutine of step (#8) is started in order to search the object frame. When this frame is fixed at the screen, a print signal for starting and executing a series of print operations is output in the step (S1004). Thereby, a sheet of copy of such frame can be obtained. In case it is judged that a number of sheets do not reach the number of prints to be loaded in the step (S1005), operation flow returns to the step (S1004) and multi-copy operation is executed.

Figure 17A:
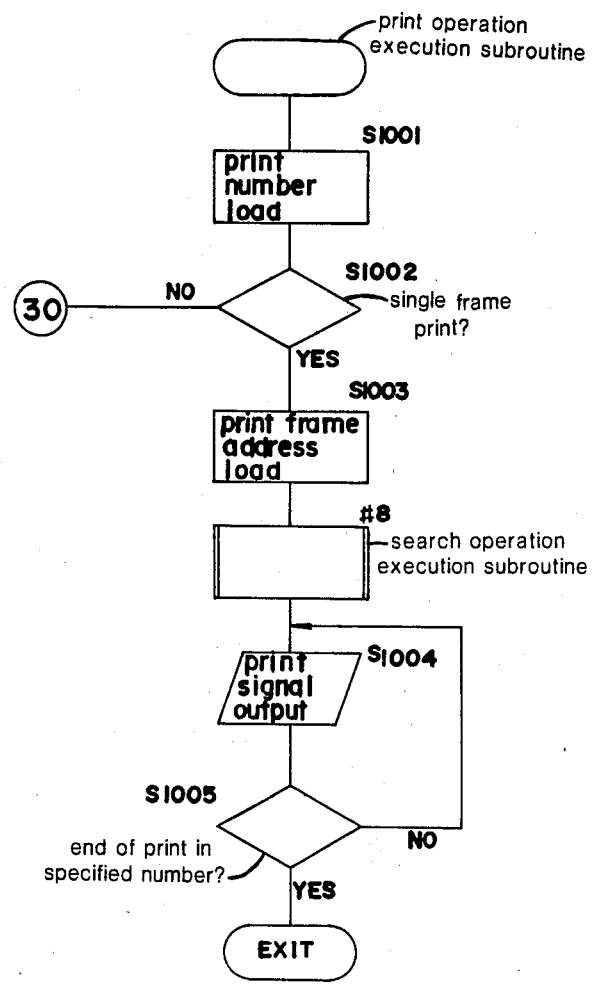
Figure 17B:
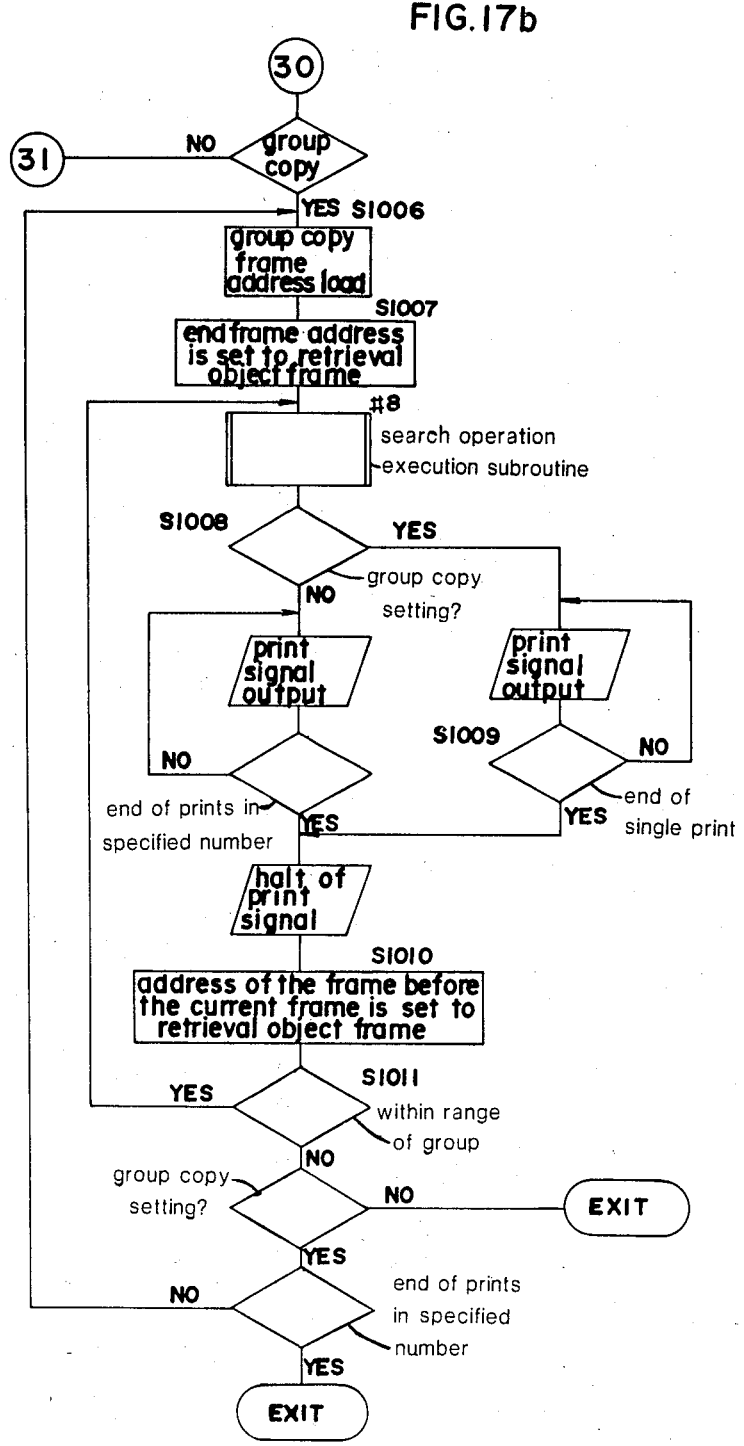

FIG. 17(b) shows the sequence of the group copy. First, the address of the frame for group copy print is loaded in the step (S1006). Next, in the step (S1007), the address of the final frame of group is set as the retrieval object frame and the Search operation execution subroutine of step (#8) is operated. Upon retrieval, it is judged whether the sort mode copy is preset by the dip switch described above in the step (S1008) or not. In case it is set, copy is carried out only for a sheet in the step (S1009), the print signal is cancelled, thereafter the address of the preceding frame copied is set as the retrieval frame in the step (S1010) and it is judged whether such address is within the range of the designated frame or not in the step (S1011), thereafter operation flow returns to the subroutine of step (#8). When the sort mode copy is not set, multi-copy is carried out for only one frame up to the specified number of sheets.

Figure 17C:
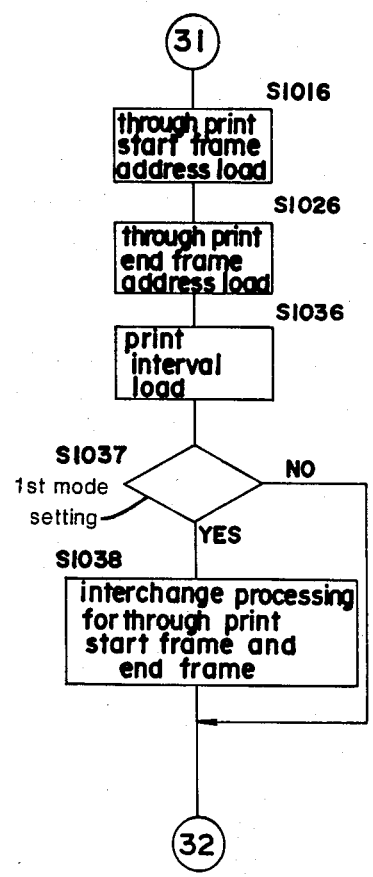
Figure 17D:
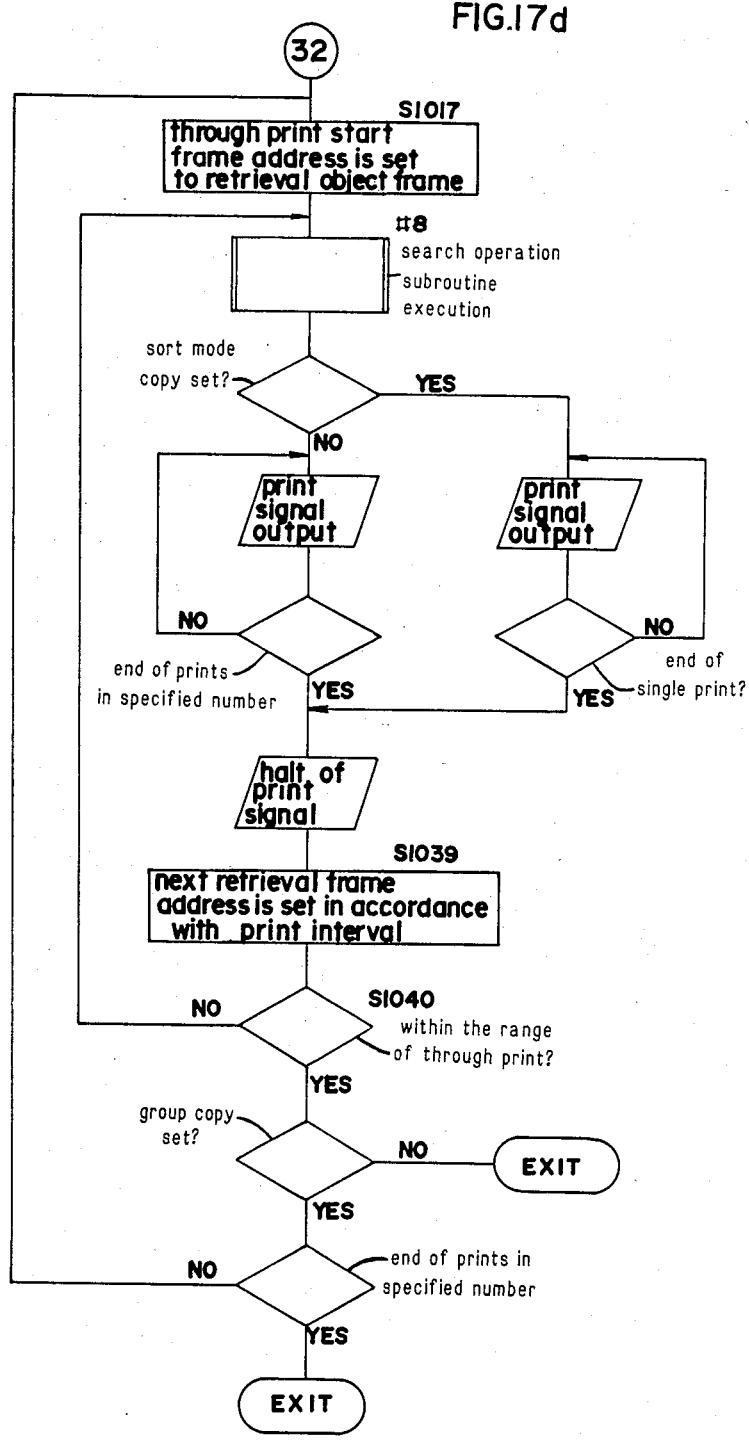

FIGS. 17(c),(d) show the sequence of through print wherein the frames between the first designated frame and the second designated frame are copied sequentially or with the predetermined interval.

First, the start frame address, end frame address and print interval of through print are loaded to this program in the steps (S1016),(S1026),(S1036). In the next step (S1037), it is judged whether the 1st mode is set by the dip switch (SW$_2$) or not. When the 1st mode is set, the through print start frame and end frame are interchanged and are set in the step (S1038). In the step (S1017) of FIG. 17(d), the through print start frame address is set to the retrieval object frame and it is retrieved by operating the Search operation execution subroutine of the step (#8). The succeeding step gruopos are almost similar to those in the flow of FIG. 17(b), the next retrieval frame is set in the step (S1039) by the print interval loaded and it is then judged whether the address has exceeded the range of through print or not in the next step (S1040). This through print operation is carried out in the sequence of the block, batch and item in accordance with the level.

FIG. 18 shows correspondence between the key manipulations for executing operation modes indicated in the flow charts and display contents. The operation sequences 1-18 are all effective for the mode 1.

In the manipulation 1 of FIG. 18(a), when the SEARCH key is depressed, an inquiry message "PAGE?" is displayed on the display. When the "1" key of ten-key is depressed and a command is executed by the RUN key, the heading part of the first frame of film is set from the rewind condition. For the retrieval of the object page, a film runs when "100" is input and the RUN key is depressed as indicated by the manipulation 2, the page 100 is halted and this frame is projected.

The manipulation 3 indicates the manipulation and display sequence in such a case where copy is carried out for 10 sheets with an interval of 5 pages from the page 200 to page 150.

The manipulation 4 indicates the manipulation and display sequence in the case where copy is carried for a sheet of each page from the page 100 to page 150.

The minipulation 5 corresponds to another copy for a sheet of page 200 after copy of page 200.

The manipulation 6 corresponds to correction of the frame number. The page 200 currently displayed is corrected to page 50. The film can be rewound by the REWIND key. Next, the heading page of the film is set to the page 100 and the limit of Duo film is set to the page 5000.

The manipulation 7 corresponds to the skip read with a display time of 5 seconds with an interval of 10 frames from the page 200 to page 300.

The manipulation 8 corresponds to the skip read of all frames from the page 150 to page 200. In this case, the dipslay time is equal to the setting of input in the manipulation 7.

The manipulations 9, 10, 11, 12 indicate the functions of the CLR/STP key. The manipulations 9 correspond to an input mistake where a number of copies (MULTI) is input as "200" in the case of obtaining 10 copies of page 150. The data "200" is cleared, then "10" is input again and the start page is set to "150".

The manipulations 10, 11, 12 show the profiles of manipulations for cancelling print command. These manipulations are also adapted to cancel the other input commands.

In FIG. 18, the PRINT, BROWSE, MEMORY keys indicated in the column of manipulation respectively correspond to the PRI key (408), BRO key (410) and MEM key (411) in FIG. 8.

FIGS. 18(d)~(g) indicate the manipulations and display for memory mode. The memory means a previously defined storing area of RAM comprised in the microcomputer. Entry reference, correction, erasure and execution of this memory are all carried out in the memory mode. The memory mode starts when the MEMORY key is depressed. A numeral data directly input is registered as a cartridge number of microfilm. The retrieval and print mode are set in the same way as the manual mode. However, any action key other than the REWIND key are not accepted at the time of entry. Reference to the memory is possible for each step by the job control keys "−", "→". The content of the memory is erasable and correctable by use of the CLR/STP key. Moreover, contents can also be executed in the unit of step with the RUN key. The memory mode can be canceled with the CLR/STP key. More practically, the manipulation 13 corresponds to being all clear of memory content under the memory mode.

The manipulation 14 shows the case where a cartridge number "100" is first registered in the memory mode and the operations to be done by this cartridge are input to the memory. Namely, the content of the operations are to search page 500, to search page 1000, to copy five sheets each for frames between page 800 and page 750 frame by frame and to rewind the film.

The manipualtion 15 shows memory input operations to another cartridge, namely the 200th cartridge. In this mode, "No.100" is first displayed. When numeral data "200" is input and the ENTER key is depressed in succession, No. 200 is stored at the heading address of the vacant region of memory. This 200th cartridge is memorized that the page 100 is copied on five sheets, and the Browsing operation is carried out with 5 seconds display for every 10 frames from the page 200 to page 300.

FIG. 18(f) indicates the stored contents of memory based on the manipulations 14 and 15.

In FIG. 18(g), the manipulation 16 indicates erasing and alteration of operation contents of the 100th cartridge. In this operation, memory mode is first set by the 'MEM' key, the next stored content is called by the "→" key, the 3rd stored content (S1000) is called in succession and then erased. It is then confirmed that reference is made to the step next to the erased step and it is erased or not by scrolling down one step. When the MEMORY key is depressed once again, content of the 200th cartridge is called. The first operation of this cartridge is called and cleared and altered to the content for 10 copies of the page 100. The next operation content is displayed and confirmed by the jog key "→".

The manipulation 17 indicates the executions in the memory mode. The step (S500) is called by the jog key "→" which in turn is operated by the RUN key. Upon completion of operation, the memory step makes advancement of one line displaying the step (P800 M5 T750 E1) after which this step is actually executed by depressing the RUN key.

The manipulation 18 indicates the execution of all memory steps concerning the cartridge number "100". When the key "0" of ten-keys and the RUN key is depressed in succession, the operations are sequentially proceeded in accordance with the memory step. If half is required in the course of operations, it is necessary to depress the CLR/STP key. During this halt of operation, another operation, namely interrupt operation can be executed. For restart of operations being halted, the memory key and the key "1" of ten-keys and the RUN key are depressed in succession. Thereby, the remaining operations not yet executed can be executed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A microfilm reader which is capable of projecting enlarged microfilm images by retrieving the microfilms under plural retrieval modes, said microfilm reader comprising:
   mode selecting means for manually selecting one of said retrieval modes;
   numeral input means for inputting numeral conditions under said selected retrieval mode;
   means for issuing a message which indicates contents of input manipulations to be executed by said numeral input means to be done next in accordance with the mode manually selected by said mode selecting means; and
   control means for controlling said reader under the selected mode on a series of control commands obtained by repetition of message displays and numeral input manipulations.

2. A microfilm reader as claimed in claim 1, wherein said numeral input means is used for inputting numbers corresponding to desired frames of microfilm.

3. A microfilm reader as claimed in claim 2, wherein said message issuing means issues the message prompting an operator to input a number of desired frames of microfilm.

4. A microfilm reader as claimed in claim 3, wherein said message is a visual message.

5. A microfilm reader as claimed in claim 4, further comprising:
   a character display means for displaying said message in characters.

6. A microfilm reader operable in plural operation modes comprising:
   means for manually selecting one of said operation modes;

means for inputting operation conditions under said operation modes;

means for issuing a message which indicates contents of input manipulations to be executed by said input means to be done next in accordance with the mode manually selected by said mode selecting means; and means for controlling said reader in the selected mode based on the conditions input by said condition inputting means after the message has been issued.

7. A microfilm reader as claimed in claim 6, wherein said issuing means comprises plural subprograms each corresponding to said operation modes.

8. A microfilm reader as claimed in claim 7, wherein said issuing means issues the message by using one of said subprograms which corresponds to the selected mode.

9. A microfilm reader operable in plural operation modes comprising:

means for manually selecting one of said operation modes;

means for inputting operation conditions under said operation modes;

means for issuing a message which indicates contents of input manipulations to be executed by said input means to be done next in accordance with the mode manually selected by said mode selecting means;

means for manually inputting a start signal to start the operation of said reader;

means for allowing input of said start signal after a predetermined input manipulation to said message is executed; and means for controlling said reader in the selected mode based on the conditions input by said condition inputting means in response to said start signal.

* * * * *